US012675110B2

(12) United States Patent
   Afman et al.

(10) Patent No.: US 12,675,110 B2
(45) Date of Patent: Jul. 7, 2026

(54) WATERCRAFT CONTROL SYSTEM AND WATERCRAFT CONTROL METHOD

(71) Applicant: YAMAHA HATSUDOKI KABUSHIKI KAISHA, Iwata (JP)

(72) Inventors: Juan Pablo Afman, Marietta, GA (US); Thomas Gurriet, Acworth, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 191 days.

(21) Appl. No.: 18/169,076

(22) Filed: Feb. 14, 2023

(65) Prior Publication Data

US 2023/0297110 A1      Sep. 21, 2023

Related U.S. Application Data

(60) Provisional application No. 63/310,305, filed on Feb. 15, 2022.

(51) Int. Cl.
   G05D 1/00 (2024.01)
   B63H 25/42 (2006.01)
   (Continued)

(52) U.S. Cl.
   CPC .......... G05D 1/0206 (2013.01); B63H 25/42 (2013.01); B63H 2020/003 (2013.01); B63H 2025/026 (2013.01)

(58) Field of Classification Search
   None
   See application file for complete search history.

(56) References Cited

U.S. PATENT DOCUMENTS 5,386,368 A      1/1995   Knight
5,491,636 A      2/1996   Robertson et al.
            (Continued)

FOREIGN PATENT DOCUMENTS

EP        3885250 A1 * 9/2021   ............. B63H 25/04
JP        2005212693      11/2005

OTHER PUBLICATIONS

Expert demo of Volvo Penta Assisted Docking system, https://www.youtube.com/watch?v=rB1srGFe4Ho&t=119s, Jan. 14, 2021, Volvo Penta.

(Continued)

*Primary Examiner* — Rachid Bendidi
*Assistant Examiner* — Nada Mahyoob Alqaderi
(74) *Attorney, Agent, or Firm* — Spencer Fane LLP

(57) ABSTRACT

A watercraft control system comprises a digital controller that controls outboard propulsion units to produce a predetermined lateral thrust to hold a watercraft against a docking structure during a dock holding mode, sets at least one of a target position and a target heading based on at least one of a current position and a current heading during the dock holding mode, and performs a correction operation to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode.

19 Claims, 11 Drawing Sheets

(51) Int. Cl.
*B63H 20/00* (2006.01)
*B63H 25/02* (2006.01)

(56) References Cited

U.S. PATENT DOCUMENTS

| | | | |
|---|---|---|---|
| 6,234,853 B1 | 5/2001 | Lanyi et al. | |
| 6,678,589 B2 | 1/2004 | Robertson et al. | |
| 7,305,928 B2 | 12/2007 | Bradley et al. | |
| 9,487,283 B2* | 11/2016 | Inoue .................... | B63H 20/10 |
| 10,322,787 B2 | 6/2019 | Ward | |
| 10,324,468 B2 | 6/2019 | Arbuckle et al. | |
| 10,429,845 B2 | 10/2019 | Arbuckle et al. | |
| 10,633,072 B1* | 4/2020 | Arbuckle ............. | B63H 21/213 |
| 10,845,812 B2 | 11/2020 | Ward et al. | |
| 12,006,015 B2* | 6/2024 | Christensen ............ | B60L 53/20 |
| 12,134,454 B1* | 11/2024 | Derginer ............. | G05D 1/0206 |
| 2004/0221787 A1 | 11/2004 | McKenney et al. | |
| 2007/0017426 A1 | 1/2007 | Kaji et al. | |
| 2007/0089660 A1 | 4/2007 | Bradley et al. | |
| 2015/0166159 A1* | 6/2015 | Inoue .................... | B63H 20/12 |
| | | | 440/53 |
| 2017/0255200 A1* | 9/2017 | Arbuckle ............. | G05D 1/0206 |
| 2018/0229823 A1 | 8/2018 | Inoue et al. | |
| 2019/0302773 A1* | 10/2019 | Akuzawa ................ | B63B 49/00 |
| 2019/0361457 A1* | 11/2019 | Johnson ............... | G05D 1/0044 |
| 2021/0163114 A1* | 6/2021 | Bondesson ............ | B63H 25/02 |
| 2021/0221485 A1 | 7/2021 | Grunewald Mayer et al. | |
| 2021/0294329 A1* | 9/2021 | Afman ..................... | G08G 3/00 |
| 2023/0150637 A1* | 5/2023 | Afman .................. | G05G 9/047 |
| | | | 701/21 |

OTHER PUBLICATIONS

Dynamic Positioning System, https://www.volvopenta.com/en-us/marine/products/easy-boating-solutions/maneuvering/dynamic-positioning-system/, Jan. 25, 2021, Volvo Penta.

Making Sense of Docksense, https://www.passagemaker.com/trawler-news/making-sense-of-docksense, Feb. 22, 2019, PassageMaker.

Runar Scott Jensen, Five benefits with proportional speed control, https://blog.side-power.com/en/five-benefits-with-proportional-speed-control, Jul. 13, 2020, Pier Talk.

Extended European Search Report of Jul. 14, 2023 of corresponding European Patent Application No. 23156494.

* cited by examiner

WATERCRAFT CONTROL SYSTEM AND WATERCRAFT CONTROL METHOD

CROSS-REFERENCE TO RELATED APPLICATIONS

This application claims the benefit of U.S. Provisional Application No. 63/310,305, filed on Feb. 15, 2022. The entire disclosure of U.S. Provisional Application No. 63/310,305 is hereby incorporated herein by reference.

BACKGROUND

Technical Field

The present disclosure generally relates to the field of watercrafts. More particularly, the present disclosure relates to a watercraft control system.

Background Information

For most drivers or users of watercrafts, docking is one of the most stressful operations of the watercrafts. For example, when docking a watercraft to a target dock, a driver or user (hereinafter merely referred to as a "user") of the watercraft needs to navigate the watercraft to the target dock within a marina along an intended course while avoiding obstructs and considering water depths, wind direction and strength, current, etc.

Furthermore, the user of the watercraft also needs to maintain the watercraft in place at the target dock for getting off or on the watercraft, for loading and unloading passengers or stuffs, etc.

SUMMARY

In particular, once the watercraft reaches the target dock, the user of the watercraft needs to get off the watercraft onto the dock to tie the watercraft down to the dock. However, it is sometimes difficult to do this without a help of other person when only one user is on board. Furthermore, even when the watercraft is being tied down to the dock, it is also necessary to maintain a secure contact between the watercraft and the dock while loading and unloading passengers so as to allow passengers to comfortably get on or off the watercraft onto the dock without worrying about the drift of the watercraft.

One object is to provide a watercraft control system that can make docking less stressful and give the user an easier boating experience.

In accordance with one aspect of the present disclosure, a watercraft control system comprises a plurality of outboard propulsion units, a user input configured to output a dock holding command, a positioning system configured to determine at least one of a current position and a current heading of a watercraft, and a digital controller configured to receive the dock holding command. The digital controller configured to start a dock holding mode upon receiving the dock holding command, control the outboard propulsion units to produce a predetermined lateral thrust to hold the watercraft against a docking structure during the dock holding mode, set at least one of a target position and a target heading based on at least one of the current position detected by the positioning system and the current heading detected by the positioning system during the dock holding mode, and perform a correction operation to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode.

In accordance with another aspect of the present disclosure, a watercraft control method comprises starting a dock holding mode using a digital controller upon receiving a docking holding command, controlling a plurality of outboard propulsion units using the digital controller to produce a predetermined lateral thrust to hold a watercraft against a docking structure, setting at least one of a target position and a target heading using the digital controller based on at least one of a current position detected using a positioning system and a current heading detected by the positioning system during the dock holding mode, and performing correction operation using the digital controller to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode.

Also, other features, aspects and advantages of the disclosed watercraft control system and the disclosed watercraft control method will become apparent to those skilled in the watercraft field from the following detailed description, which, taken in conjunction with the annexed drawings, discloses several illustrative embodiments of a watercraft control system and a watercraft control method with various features.

BRIEF DESCRIPTION OF THE DRAWINGS

Referring now to the attached drawings which form a part of this original disclosure, watercrafts are illustrated having a watercraft control system.

Figure 1:
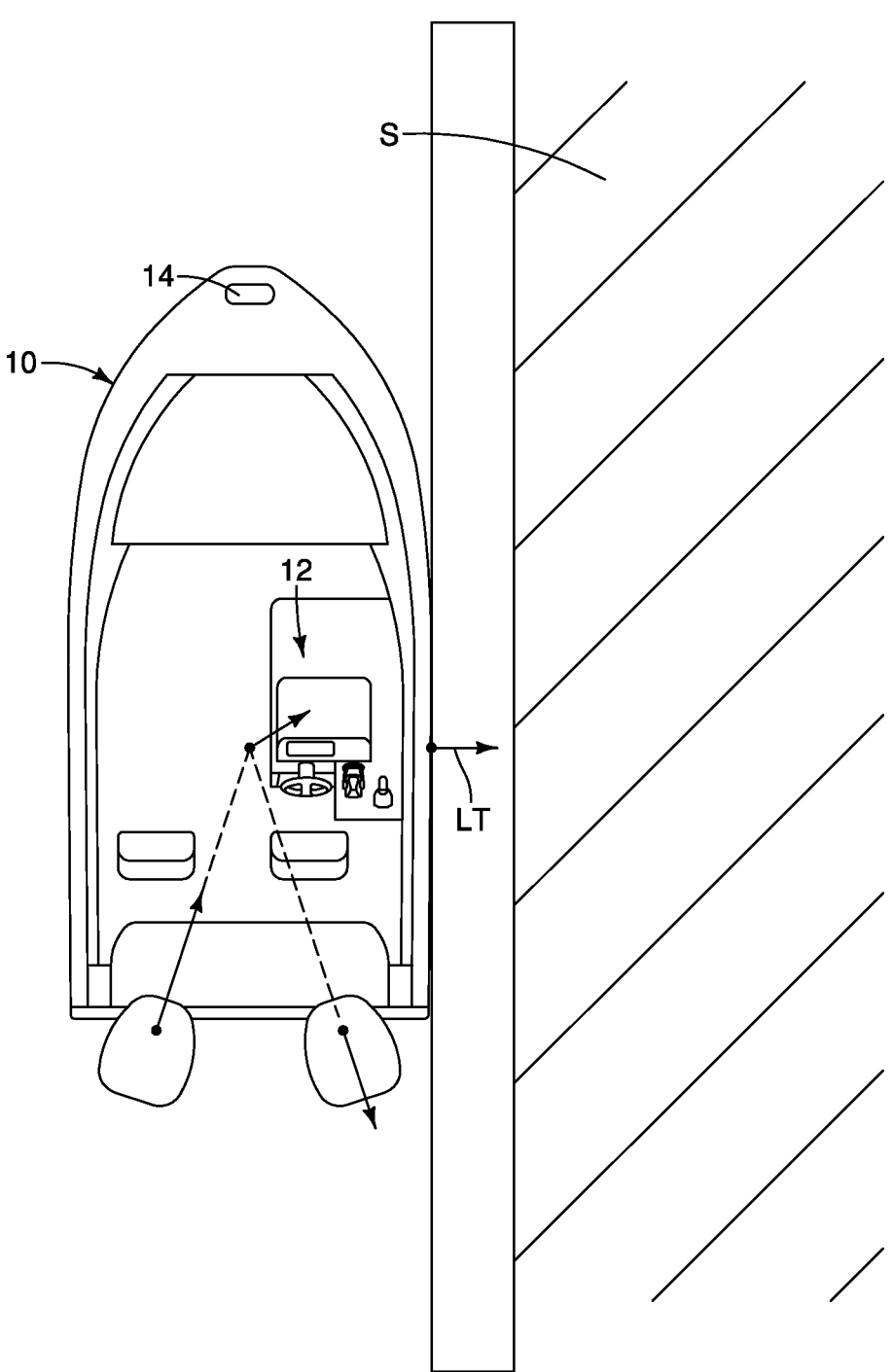
FIG. 1 is a schematic top view of a watercraft equipped with a watercraft control system in which the watercraft is autonomously controlled to maintain a target position and a target heading while producing a predetermined lateral thrust to hold the watercraft against a docking structure in accordance with the present disclosure.

It should be noted that these figures are intended to illustrate the general characteristics of methods, structures and/or materials utilized in certain illustrative embodiments and to supplement the written description provided below. These drawings are not, however, to scale and may not precisely reflect the precise structural or performance characteristics of any given embodiment and should not be interpreted as defining or limiting the range of values or properties encompassed by illustrative embodiments. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the watercraft field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIG. 1, a watercraft 10 is illustrated in accordance with one embodiment. The watercraft 10 includes a watercraft control system 12 that is configured to autonomously navigate the watercraft 10 in a dock holding mode to hold the watercraft 10 against a docking or mooring structure S at a dock, as explained later in more detail. The watercraft control system 12 can be integrated with a main watercraft control system of the watercraft 10, or can be an add-on watercraft control system that supplements the main watercraft control system of the watercraft 10. In either case, the watercraft 10 is equipped with the watercraft control system 12 for holding the watercraft 10 against the docking structure S at the dock. In the illustrated embodiment, the term "dock" as used herein means not only a spacing or area of water next to the docking structure S, such as pier, quay, jetty, wharf, or other fixtures, to which a watercraft can be moored, as shown in FIG. 1.

Here, in the illustrated embodiment, the watercraft control system 12 of the watercraft 10 includes an onboard detector 14 that is configured to detect peripheral environment of the watercraft 10 in real-time. Preferably, the detector 14 includes one or more active sensors such as lasers, lidar, or millimeter-wave radars. However, the detector 14 can also include an image recognition device and/or optical sensors such as one or more cameras.

Figure 2:
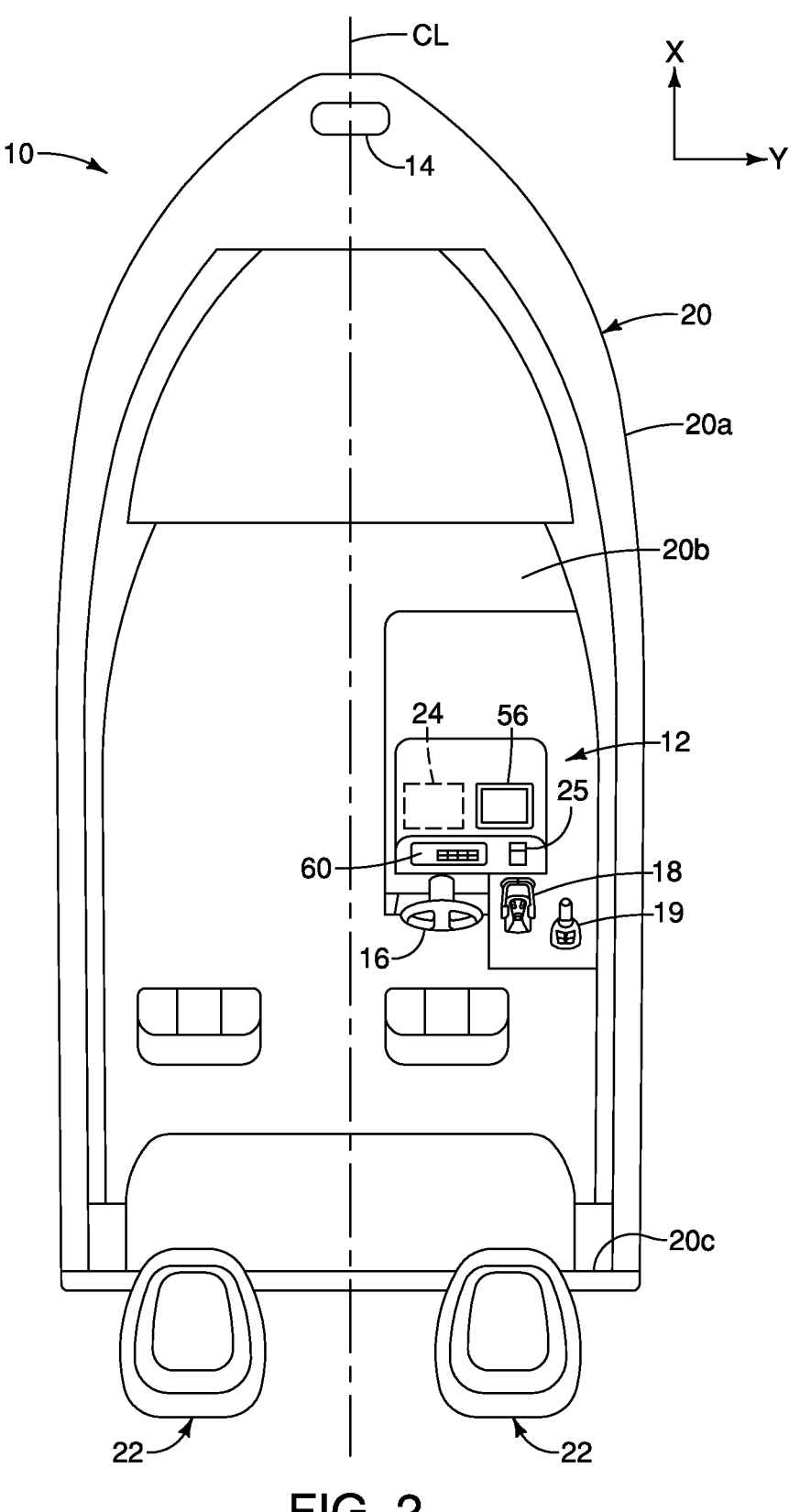
FIG. 2 is a simplified top view of the watercraft including the watercraft control system in accordance with the present disclosure.

In the illustrated embodiment, the watercraft 10 is further configured to be driven in an autopilot mode or a manual mode. Here, the watercraft 10 is provided with a drive-by-wire system that operates the watercraft 10, and that is configured to perform various operations of the watercraft 10. Specifically, as shown in FIG. 2, the watercraft 10 is provided with a cockpit that has a steering wheel or helm 16 and a remote control 18. The steering wheel 16 is used by a driver or user (hereinafter merely referred to as a "user") of the watercraft 10 to manually turn the watercraft 10, and thus, manually change a propulsion direction of the watercraft 10. The remote control 18 is used by the user to manually control a propulsion force of the watercraft 10. Furthermore, as shown in FIG. 2, the cockpit has a joystick 19 that is used by the user to simultaneously control a steering and a propulsion force of the watercraft 10 to move and turn the watercraft 10 in any direction. In the autopilot mode, the user sets a cruising speed for the watercraft 10 and a travel path defined by waypoints in a conventional manner. In particular, in the autopilot mode, the main watercraft control system of the watercraft 10 servers as an autopilot system of the watercraft 10, and is configured to autonomously navigate the watercraft 10 at the preset cruising speed along the travel path. However, of course, the autopilot system can be integrated with the watercraft control system 12 as needed and/or desired. In some cases, the watercraft 10 does not need to be provided with the autopilot system.

Furthermore, as explained later in more detail, the watercraft 10 includes various sensors or detectors (i.e., a positioning system) to determine a current position and a current heading of the watercraft 10. With this configuration, in the illustrated embodiment, once the dock holding mode is engaged, the watercraft 10 is autonomously navigated to hold the watercraft 10 against the docking structure S until the dock holding mode is disengaged. During the dock holding mode, the watercraft 10 is autonomously navigated to produce a predetermined lateral thrust LT toward the docking structure S and to maintain the current position and the current heading of the watercraft 10 at a target position and a target heading. In particular, the dock holding mode, the watercraft 10 is autonomously navigated to produce the predetermined lateral thrust LT toward the docking structure S for gently pushing the watercraft 10 against the docking structure 10) to create the contact between the watercraft 10 and the docking structure S. In the illustrated embodiment, this predetermined lateral thrust LT is generated by outboard propulsion units of the watercraft 10, and thus the watercraft 10 does not need to have a dedicated bow thruster. In the illustrated embodiment, after the dock holding mode is engaged, the user of the watercraft 10 does not need to input any control commands (i.e., hands free) unless the watercraft control system 12 experiences a failure or the user of the watercraft 10 wants to disengage the dock holding mode.

Referring to FIG. 2, a simplified top view of the watercraft 10 is illustrated, and some of the parts of the watercraft 10 will now be discussed. In the illustrated embodiment, the watercraft 10 basically includes a watercraft body 20 and a plurality of (two in FIG. 2) propulsion units 22 (e.g., a plurality of outboard propulsion units). The detector 14 is preferably mounted to the watercraft body 20 near the front end of the watercraft 10. Preferably, the detector 14 is disposed on a centerline CL of the watercraft body 20. However, the location of the detector 14 is not limited to the illustrated location.

Here, the watercraft 10 is illustrated as an outboard motor boat that is equipped with the watercraft control system 12. However, the watercraft control system 12 is not limited to being used with an outboard motor boat. Rather, as explained later, the watercraft control system 12 can be applied to practically any watercraft that includes a propulsion system and a steering system.

Here, the watercraft body 20 basically includes a hull 20a and a deck 20b. The deck 20b is provided on the hull 20a in a conventional manner. Preferably, the hull 20a and the deck 20b are integrated to form a unit. The hull 20a, the deck 20b and the other parts of the watercraft 10 are made of suitable materials that are typically used in watercrafts for a marine environment, and thus, the materials of the various parts of the watercraft 10 will not be discussed herein. However, the watercraft body 20 is not limited to the illustrated hull and deck construction. Rather, the construction of the watercraft body depends on the type of watercraft. For example, a watercraft body of a pontoon boat typically includes two or more pontoons that support a deck. Also, for example, the watercraft body may not have a deck.

Figure 3:
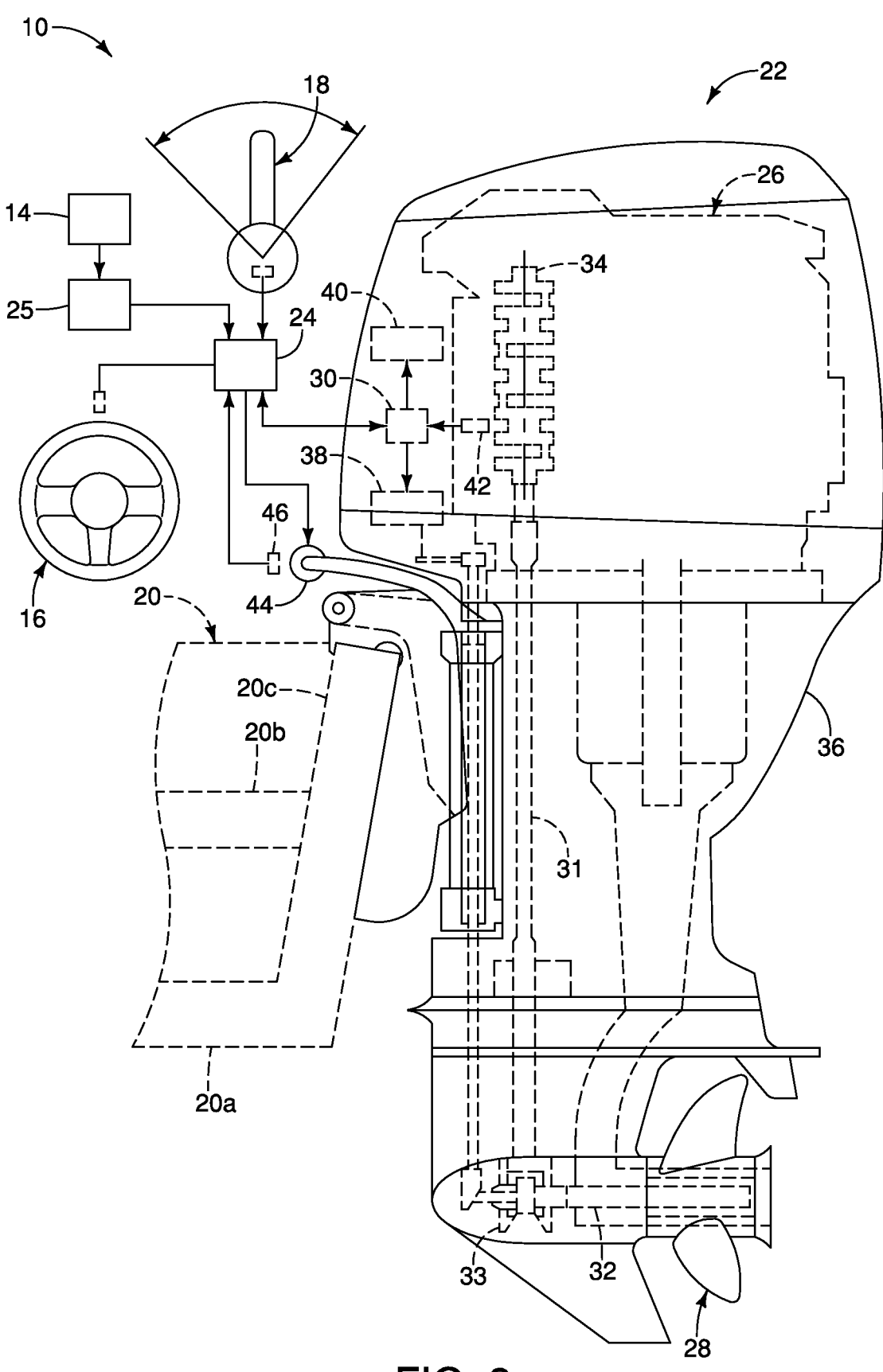
FIG. 3 is a simplified partial side view of a rear portion of the watercraft showing one of the propulsion units with various controls schematically illustrated.

The propulsion units 22 are provided to propel the watercraft 10 in a conventional manner. In the illustrated embodiment, two of the propulsion units 22 (a first or left propulsion unit 22 and a second or right propulsion unit 22) are provided in the form of two outboard motors as seen in FIG. 2 (only one of the propulsion units 22 is shown in FIG. 3). However, the propulsion units 22 are not limited to this illustrated configuration of the illustrated embodiment. It is acceptable for the propulsion units to be inboard motors or water jet propulsion devices instead of outboard motors. Basically, the term "propulsion unit" as used herein is a machine that produces a thrust to push a watercraft. The propulsion unit can also be referred to as a propulsion device or a propulsion system. A propulsion unit or device typically includes a drive source (e.g., an engine or an electric motor) and a propulsor (e.g., a propeller or an impeller) that provide a thrust to the watercraft.

While the watercraft 10 is illustrated as having two of the propulsion units 22, it will be apparent from this disclosure that the watercraft 10 can have only a single propulsion unit, three or more propulsion units, as needed and/or desired, depending on the particular design of the watercraft. Also, the watercraft 10 can be provided with one or more other types of propulsion units such as one or more water-jet drives and/or inboard motors. In other words, the dock holding mode of the watercraft control system 12 can be used with other types of propulsion systems other than the propulsion system illustrated in the illustrated embodiment. In any case, the watercraft 10 comprises at least one propulsion unit that is provided to the watercraft body 20, and more preferably further comprises an additional propulsion unit 22 that is provided to the watercraft body 20.

The propulsion units 22 are controlled by the user using the steering wheel 16 to manually turn the watercraft 10, and using the remote control 18 to manually control a propulsion force (thrust) of the watercraft 10. The remote control 18 is also used by the user to reverse the direction of the thrusts of the propulsion units 22. Preferably, the propulsion units 22 can be independently turned with respect to each other. Also, the thrust of the propulsion units 22 can be independently controlled by the user. Here, the steering system of the watercraft 10 is a steer-by-wire system in which the steering wheel 16 is not mechanically connected to the propulsion units 22. However, the watercraft control system 12 can be adapted to a mechanical steering system. Likewise, the remote control 18 is not mechanically connected to the propulsion units 22. However, the watercraft control system 12 can be adapted to a watercraft having a mechanical throttle system. Since the steering systems and throttle systems are well known and the dock holding mode of the watercraft control system 12 can be adapted to those known systems, the steering system and throttle system of the watercraft 10 will only be briefly discussed herein.

Figure 4:
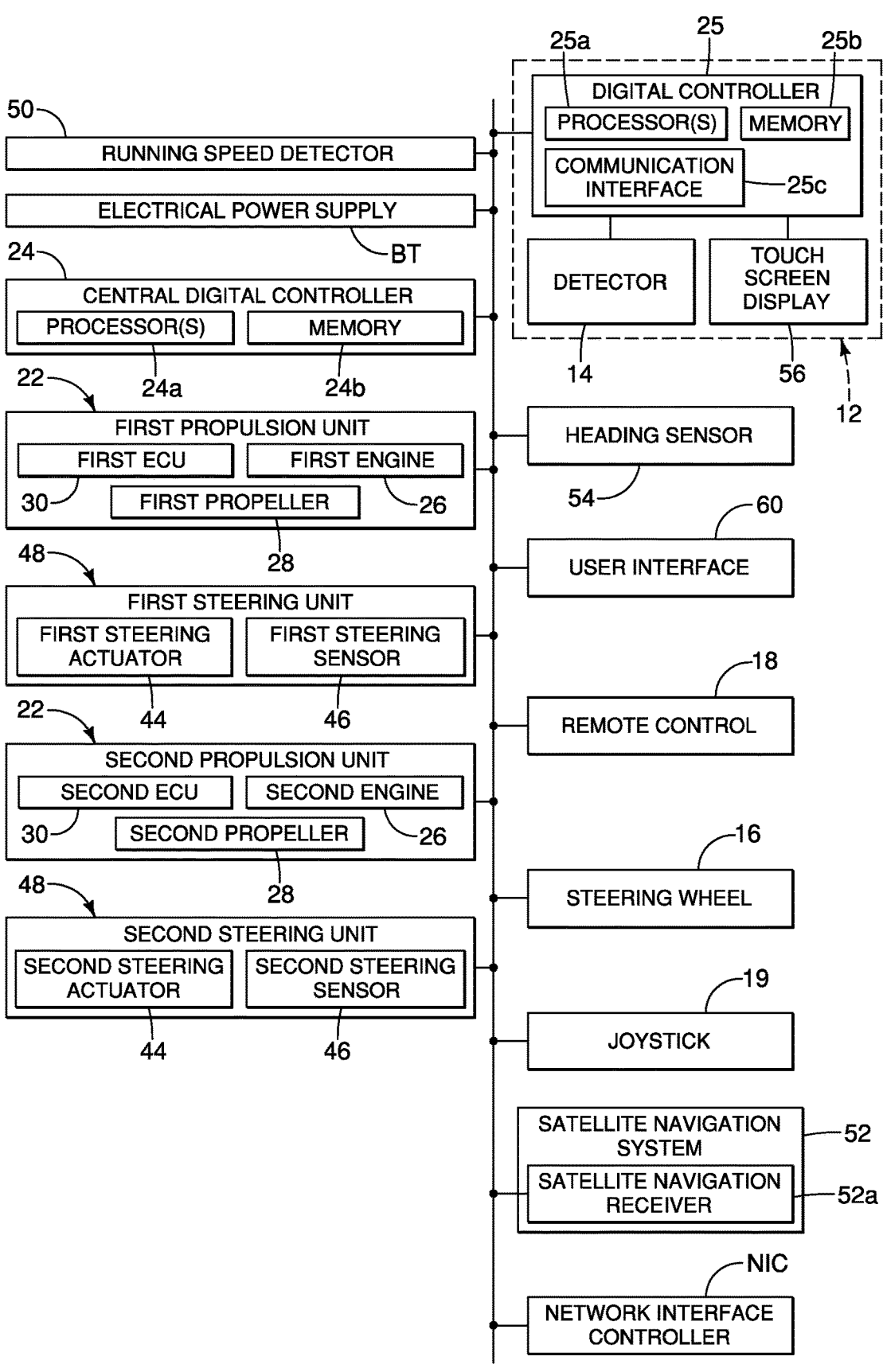
FIG. 4 is a block diagram of selected components of the watercraft equipped with the watercraft control system having a digital controller (graphics processing unit or GPU) that communicates with a central digital controller (boat control unit or BCU) of the watercraft.

FIG. 4 illustrates a block diagram of selected components of the watercraft 10. As schematically illustrated in FIG. 4, the watercraft 10 is provided with a central digital controller 24 that is connected to a network of the watercraft 10, and the watercraft control system 12 includes a digital controller 25 that is connected to the network of the watercraft 10. For example, the network of the watercraft 10) can be Controller Area Network (CAN bus) that allow microcontrollers and devices to communicate with each other. The central digital controller 24 can be also referred to as a boat control unit (BCU), while the digital controller 25 can be also referred to as a graphics processing unit (GPU). In FIG. 4, the watercraft control system 12 is illustrated as an add-on component of the watercraft 10. However, some or all of the functions of the digital controller 25 (GPU) could be integrated into the central digital controller 24 (BCU). Thus, the term "digital controller" is not limited to a single controller having one or more processors, but rather includes one controller as well as two or more controllers that are physically separated from each other. Thus, for example, the term "digital controller" can include a GPU by itself, the BCU by itself or both the GPU and the BCU.

Also as seen in FIG. 4, the watercraft 10 is provided with an electrical power supply BT (e.g., a battery) for supplying electrical power the central digital controller 24 and the digital controller 25 as well as to the various electrical components of the watercraft 10. Of course, the digital controller 25 can have its own electrical power supply (e.g., a battery) if desired.

The central digital controller 24 can be a microcomputer. The central digital controller 24 includes a processor 24a, such as a CPU (Central Processing Unit) and memory 24b (computer storage) such as a ROM (Read Only Memory) and a RAM (Random Access Memory). The central digital controller 24 can also include other conventional components such as an input interface circuit and an output interface circuit. The processor 24a of the central digital controller 24 is programmed to control the various components of the watercraft 10 such as adaptive cruise control, autopilot control, satellite positioning control, etc. The memory 24b of the central digital controller 24 stores processing results, detection results and control programs such as ones for controlling the watercraft 10. For example, the RAM stores statuses of operational flags and various control data, while the ROM stores the control programs for various operations.

In the illustrated embodiment, the central digital controller 24 is programmed to control the propulsion units 22 in accordance with operation signals from the steering wheel 16 and the remote control 18 as well as control signals or settings from the watercraft control system 12. The basic controls of the propulsion units 22 in accordance with the operation signals from the steering wheel 16 and the remote control 18 are relatively conventional, and thus, the basic controls of the propulsion units 22 will not be discussed in detail herein. The central digital controller 24 is also programmed to automatically control the propulsion units 22 based on detection results of sensors or detectors.

While the central digital controller 24 and the watercraft control system 12 are illustrated as separate components in which the watercraft control system 12 is connected to the network of the watercraft 10, the watercraft control system 12 can be integrated with the central digital controller 24. In other words, here, the watercraft control system 12 is an add-on component that is plugged into the network of the watercraft 10. Thus, as illustrated in FIG. 4, the watercraft control system 12 includes its own digital controller 25 having at least one processor 25*a*, such as a CPU (Central Processing Unit) and a memory 25*b* (e.g., a computer storage or memory) such as a ROM (Read Only Memory) and a RAM (Random Access Memory). On the other hand, if the watercraft control system 12 is fully integrated into the watercraft 10, then the watercraft control system 12 can use the central digital controller 24 to carry out the dock holding mode.

The digital controller 25 is configured to communicate with the detector 14 to receive a detection signal from the detector 14. Here, for example, the digital controller 25 is provided with a communication interface 25*c* (e.g., an I/O interface) that is used to communicate with the detector 14 either wirelessly or via a wired connection to the network of the watercraft 10. Thus, the digital controller 25 can also communicate with the onboard computer system of the watercraft 10 via the communication interface 25*c*. Here, for example, the digital controller 25 is plugged into a network interface controller NIC (e.g., a MicroAutoBox by dSpace), and the detector 14 is plugged into a USB port of the communication interface 25*c* of the digital controller 25. The processor 25*a* of the digital controller 25 (the GPU) communicates with the digital controller 24 (the BCU). In this way, the digital controller 25 can communicate with the central digital controller 24 as well as communicate with the other components of the watercraft 10 that are connected to the network of the watercraft 10.

Here, as described above, the detector 14 includes the lidar sensor, for example, and detects the peripheral environment of at least 30 meters (or 100 feet) around the watercraft 10. Specifically, the detector 14 can detects the presence of the docking structures S and the obstructs, such as other watercrafts, as well as the distance from the watercraft 10 to the docking structures S and the obstructs, as needed and/or desired.

Still referring to FIG. 4, each of the propulsion units 22 basically includes an internal combustion engine 26 (i.e., a drive source) and a propeller 28 (i.e., a propulsor). Here, each of the propulsion units 22 further includes an engine control unit 30 (ECU). Alternatively, for example, the engine control units 36 can be omitted and the control of the internal combustion engines 26 (hereinafter "the engines 26") can be performed by the central digital controller 24. Here in FIG. 4, the engines 26 are referred to as a first engine and a second engine to distinguish the engines 26. Likewise, in FIG. 4, the propellers 28 are referred to as a first propeller and a second propeller. Also, in FIG. 4, the engine control units 36 are referred to as a first ECU and a second ECU. Each of the engine control units 30 is a digital controller similar in configuration to the configuration of the central digital controller 24 that is previously discussed. Each of the engine control units 30 is programmed to control its respective propulsion unit 22 to independently generate the propulsion forces of the propulsion units 22, respectively, and to independently steer or turn the propulsion units 22, respectively, in order to propel and steer the watercraft 10.

Referring back to FIG. 3, one of the propulsion units 22 is illustrated in more detail. Since the construction of the propulsion units 22 are the same, the description of the propulsion unit 22 illustrated in FIG. 3 also applies to the other propulsion units 22. The propulsion unit 22 is mounted to a rear portion 20*c* of the hull 20 in a conventional manner. The engine 26 is connected to the propeller 28 via a drive shaft 31 and a propeller shaft 32. The propeller shaft 32 is connected to the drive shaft 31 through a drive transmission 33. The engine 26 rotates the propeller 28 via the drive shaft 31 and the propeller shaft 32 to generate a thrust for propelling the watercraft 10. The drive transmission 33 switches the rotational direction of the power to be transmitted from the drive shaft 31 to the propeller shaft 32. The drive transmission 33 includes, for instance, a plurality of gears and a clutch that changes meshing of the gears. The drive shaft 31 is operatively connected to a crankshaft 34 of the engine 26 so that rotation of the crankshaft 34 is transmitted to the drive shaft 31 which in turn transmits rotation to the propeller shaft 32 to rotate the propeller 28. The engine 26, the drive shaft 31, the propeller shaft 32 and the drive transmission 33 are provided in a housing 36.

The propulsion unit 22 is provided with a shift actuator 38 that is electrically connected to the engine control unit 30 as seen in FIG. 3. The shift actuator 38 includes, for example, an electric motor or other types of actuators that is configured to switch an operating position of the drive transmission 33 of the propulsion unit 22 to a forward position to generate a forward propulsion force, a reverse position to generate a reverse or rearward propulsion force, or a neutral position. Thus, the shift actuator 38 is configured to operate the drive transmission 33 to change rotational direction of the propeller shaft 32 and the propeller 28 between a forward drive thrust and a reverse drive thrust. Preferably, the shift actuator 38 is an electric actuator that is electrically controlled by the engine control unit 30. The engine control unit 30 is programmed to operate the shift actuator 38 to control the drive transmission 33 based on a control signal received from the central digital controller 24.

The propulsion unit 22 is also provided with a throttle actuator 40 that is electrically connected to the engine control unit 30 as seen in FIG. 3. The throttle actuator 40 includes, for example, an electric motor or other types of actuators for change the output of the engine 26. Namely, the throttle actuator 40 changes an opening degree of a throttle valve to adjust the output or speed of the engine 26. Preferably, the throttle actuator 40 is an electric actuator that is electrically controlled by the engine control unit 30. The propulsion unit 22 is also provided with an engine speed sensor 42 that detects a rotational speed of the crankshaft 34 of the engine 26 to determine an engine rotational speed of the engine 26. The detection signal of the engine speed sensor 42 is transmitted to the engine control unit 30, the central digital controller 24 and/or the digital controller 25. The engine control unit 30 is programmed to operate the throttle actuator 40 to control the speed of the engine 26 based on a control signal received from the central digital controller 24.

The propulsion unit 22 is also provided with a steering actuator 44 that is electrically connected to the engine control unit 30 as seen in FIG. 3. The steering actuator 44 includes, for example, a hydraulic or electric cylinder, or other types of actuators that is provided to turn the propulsion unit 22 relative to the watercraft 10. The propulsion unit 22 is also provided with a steering angle sensor 46 that detects a steering angle of the propulsion unit 22. The steering angle sensor 46 can be, for example, a stroke sensor of the hydraulic cylinder of the steering actuator 44. The steering angle sensor 46 transmits the detection result to the engine control unit 30, the central digital controller 24 and/or the digital controller 25. The engine control unit 30 is programmed to operate the steering actuator 44 to control the propulsion direction of the watercraft 10.

In the illustrated embodiment, a user input provided to the steering wheel 16 is electronically communicated through the central digital controller 24. A steering sensor (not shown) is in communication with at least one of the steering wheel 16 and a steering shaft that is associated with the steering wheel 16. The steering sensor 46 is arranged to provide a signal indicative of a rotational position, angular position, input force, or input torque applied to at least one of the steering wheel 16 or a steering shaft (not shown) associated with the steering wheel 16 to the central digital controller 24. The central digital controller 24 is arranged to receive the signal and provide commands or signals to the engine control units 30 of the propulsion units 22 and/or the steering actuator 44 to move the propulsion units 22 as a rudder. However, when the watercraft control system 12 is in the dock holding mode, the user inputs are not needed, and the propulsion units 22 and/or the steering actuator 44 are controlled by the central digital controller 24 based on the detection signals from the various sensors.

As seen in FIG. 4, for example, the watercraft 10 can be provided with a running speed detector 50 (e.g., a GPS speedometer, a pitot speedometer, etc.), at least one satellite navigation receiver 52*a* (e.g., a Global Positioning System (GPS) receiver, a Navigation Satellite System (NSS) receiver, or a Global Navigation Satellite System (GNSS) receiver) of a satellite navigation system 52, and a heading sensor 54 (e.g., onboard gyro and tilt sensors). The running speed detector 50, the satellite navigation receiver 52*a* and the heading sensor 54 can be integrated into a single unit that provides speed data, heading data and position data. Thus, in the illustrated embodiment, the running speed detector 50, the satellite navigation receiver 52*a* and the heading sensor 54 can form a positioning system that is configured to determine at least one of the position (i.e., current position) and the heading (i.e., current heading) of the watercraft 10. The running speed detector 50, the satellite navigation receiver 52*a* and the heading sensor 54 are connected to the central digital controller 24 and/or the digital controller 25 by the network of the watercraft 10 so that signals are communicated to the central digital controller 24 and/or the digital controller 25 via the network of the watercraft 10. The speed of the watercraft 10 can be provided to the central digital controller 24 and/or the digital controller 25 by a detection signal from the running speed detector 50, or can be provided to the central digital controller 24 and/or the digital controller 25 by a GNSS signal that is received by the satellite navigation receiver 52*a*. The position or location of the watercraft 10 can be provided to the central digital controller 24 and/or the digital controller 25 based on the GNSS signal that is received by the satellite navigation receiver 52*a*. The heading of the watercraft 10 can be provided to the central digital controller 24 and/or the digital controller 25 based on the heading sensor 54. Thus, the central digital controller 24 and/or the digital controller 25 receives the speed of the watercraft 10, the position or location of the watercraft 10, and the heading of the watercraft 10 based on detection results from various receivers, detectors and/or sensors. Of course, the position and/or the heading of the watercraft 10 can be determined by different manner. For example, when a plurality of (two, for example) satellite navigation receivers 52*a* are disposed on spaced apart locations on the watercraft 10, the heading of the watercraft 10 can be determined by calculating the heading of the watercraft 10 based on the position data of the spaced apart locations on the watercraft 10 obtained from the satellite navigation receivers 52*a*. In this case, the watercraft 10 can be configured without the heading sensor 54. In either case, the watercraft control system 12 can obtain the current position and the current heading of the watercraft 10 detected by the positioning system (i.e., the running speed detector 50, the satellite navigation receiver 52*a* and the heading sensor 54).

Figure 5:
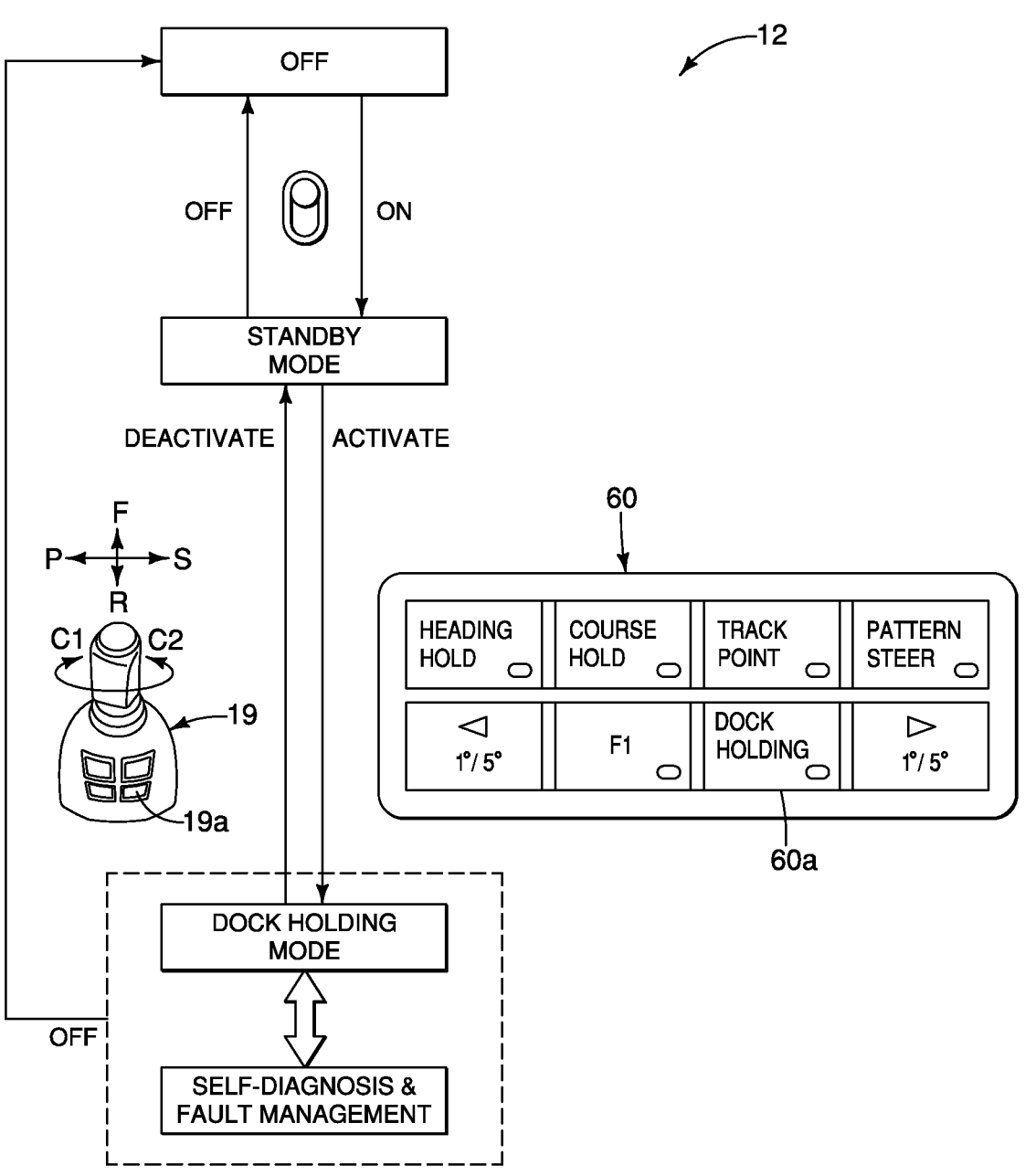
FIG. 5 is a simplified high level logic diagram illustrating a dock holding mode executed by the watercraft control system.

As seen in FIG. 5, the watercraft control system 12 further comprises a user interface such as a touch screen display 56, a control panel 60 and the joystick 19. The touch screen display 56 has a processor that communicates with the processor 25*a* of the digital controller 25 via the connection through the communication interface 25*c* and a display screen or touch screen such that the touch screen display 56 displays the map image generated based on the detection signals from the detector 14 as well as other information related to the dock holding mode.

The control panel 60 is provided on the watercraft body 20 and communicates with the central digital controller 24 and/or the digital controller 25. Specifically, the control panel 60 is programmed to be used to operate with the central digital controller 24 and/or the digital controller 25. The control panel 60 has physical control buttons that are assigned to various control of the watercraft 10 in the autopilot mode and the dock holding mode. In the illustrated embodiment, a control button 60*a* is assigned to activation/deactivation of the dock holding mode. The joystick 19 is provided on the watercraft body 20 and communicates with the central digital controller 24 and/or the digital controller 25. Specifically, the joystick 19 is programmed to be used to operate with the display monitor 56 and the central digital controller 24 and/or the digital controller 25. The joystick 19 has physical control buttons that are assigned to various control of the watercraft 10. In the illustrated embodiment, a control button 19*a* is assigned to activation/deactivation of the dock holding mode. In this way, the user can use the control panel 60 and/or the joystick 19 to activate and deactivate the dock holding mode. Alternatively or additionally, the watercraft control system 12 can use a multifunction display that is built into the watercraft 10 instead of or in conjunction with the touch screen display 56. The multifunction display of the watercraft 10 can be a touch screen display, or a display without a touch screen, and one or more knobs and/or buttons, and can be programmed to activate and deactivate the dock holding mode. In the illustrated embodiment, an example will be shown in which user inputs or selections in the dock holding mode are performed through push operations relative to the control button 19*a* of the joystick 19 or relative to the control button 60*a* of the control panel 60 using user's fingers or other indicators. However, these user inputs or selections in the dock holding mode can also be performed through operations using the touch screen display 56 and/or the multifunction display, as needed and/or desired. Thus, in the illustrated embodiment, the watercraft 10 comprises the watercraft control system and the watercraft body 20 that is provided with the propulsion units 22 (e.g., the outboard propulsion units), the joystick 19 (e.g., the user input), the satellite navigation receivers 52*a* (e.g., the positioning system) and the digital controller 25.

Referring now to FIGS. 5 to 7C, the dock holding mode executed by the watercraft control system 12 will now be discussed. As seen in FIG. 5, a state transition logic is illustrated for the watercraft control system 12. When the watercraft 10 is started, the central digital controller 24 and the digital controller 25 are initialized and various other components are automatically activated. Before the user activates the dock holding mode, the watercraft control system 12 will enter a standby or idling mode. In the standby mode, the watercraft control system 12 waits for the user to activate the dock holding mode by pressing the control button 19*a* of the joystick 19 or the control button 60*a* of the control panel 60, etc.

After the user brings the watercraft 10 alongside the docking structure S in the autopilot mode or in the manual mode in a predetermined docking direction, the user activates the dock holding mode to hold the watercraft 10. Here, the "docking direction" indicates a side of the watercraft 10 (i.e., "Port" or "Starboard") that is brought alongside the docking structure S when the watercraft 10 is located at the dock. For example, FIG. 1 illustrates a docking of the watercraft 10 on the starboard side (i.e., the "docking direction" is "Starboard"). Once the user presses the control button 19*a* of the joystick 19 or the control button 60*a* of the control panel 60 to input a dock holding command, the digital controller 25 activates the dock holding mode to automatically hold the watercraft 10 against the docking structure S. While engaging the dock holding mode, there are no necessary inputs required from the user, unless the watercraft control system 12 experiences a failure or the user wants to disengage the dock holding mode by pressing the control button 19*a* of the joystick 19 or the control button 60*a* of the control panel 60 to input a termination command, for example. Thus, in the illustrated embodiment, the digital controller 25 starts or activates the dock holding mode upon receiving the dock holding command. Also, the digital controller 25 terminates the dock holding mode upon receiving the termination command from the user input, such as the joystick 19, control panel 60, etc.

Figure 6:
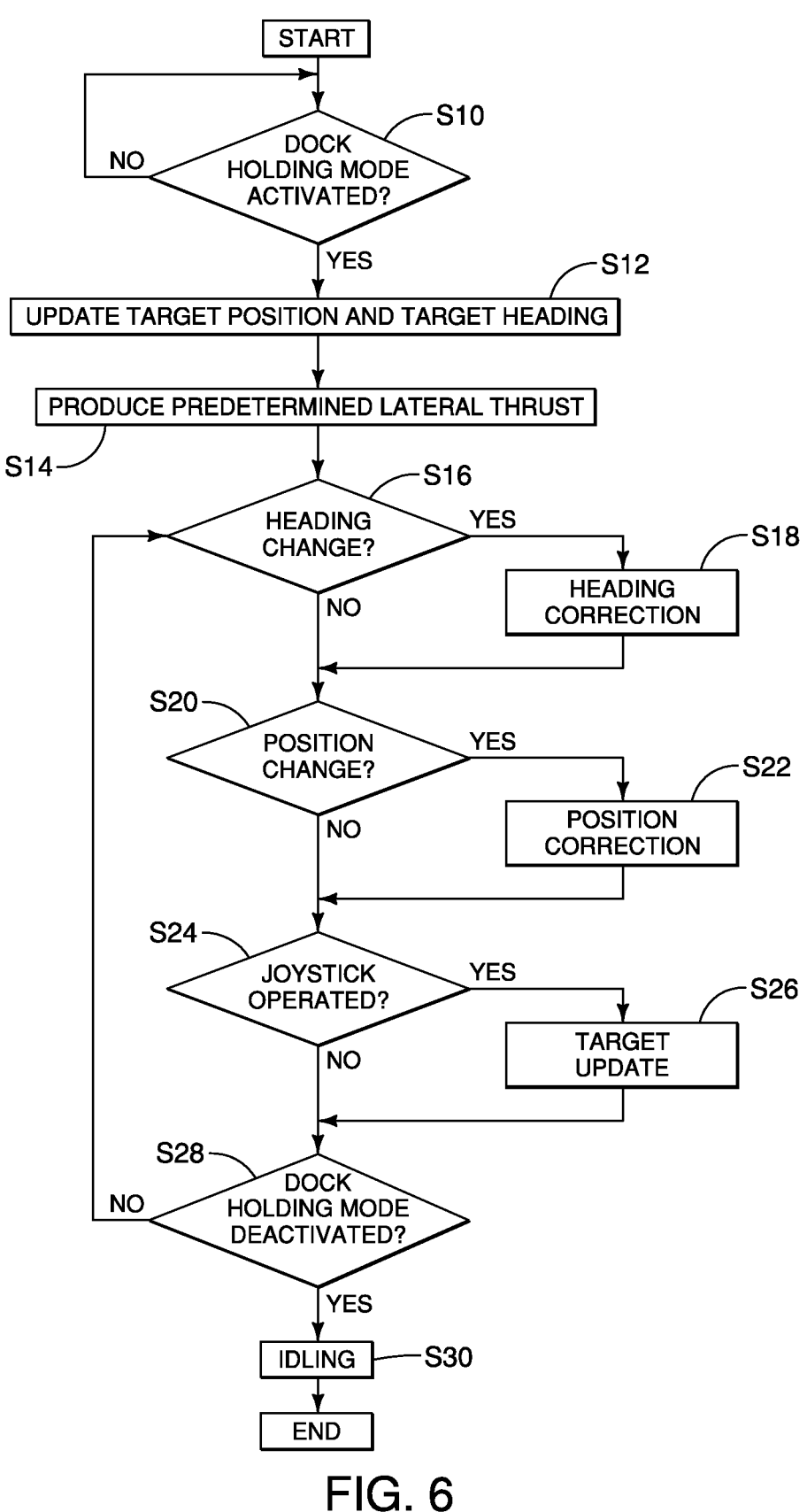
FIG. 6 is a flow chart of a dock holding control in the dock holding mode executed by the watercraft control system.

FIG. 6 is a flowchart illustrating the operation of the watercraft 10 in the dock holding mode. As mentioned above, when the watercraft 10 is started, the watercraft control system 12 will enter the standby mode. In the standby mode, the watercraft control system 12 waits for the user to activate the dock holding mode by pressing the control button 19*a* of the joystick 19 or the control button 60*a* of the control panel 60 (step S10). If the digital controller 25 of the watercraft control system 12 detects that the control button 19*a* or the controller button 60*a* is pressed, then the digital controller 25 activates the dock holding mode ("Yes" in step S10).

At the time of the dock holding mode being activated, the digital controller 25 obtains a current position Pc of the watercraft 10 and a current heading Hc of the watercraft 10 (FIGS. 7A to 7C) based on detection results from various receivers, detectors and/or sensors, as mentioned above. For example, in the illustrated embodiment, the digital controller 25 obtains the current position Pc of the watercraft 10 by calculation based on the position data from the satellite navigation receiver 52*a* of the satellite navigation system 52. Specifically, in the illustrated embodiment, the current position Pc indicates a current position of the watercraft 10 along the centerline CL (or in the current heading Hc) of the watercraft 10 (i.e., a longitudinal or forward-rear position). In particular, the digital controller 25 can calculate the current position Pc of the watercraft 10 by coordinate transformation of the position data from the satellite navigation receiver 52*a* into a coordinate system on the watercraft 10 with an X-axis defined along the centerline CL (i.e., a longitudinal or forward-rear axis/direction) and a Y-axis defined perpendicular to the X-axis (i.e., a lateral axis/direction). Also, the digital controller 25 obtains the current heading Hc of the watercraft 10 by calculation based on position data from two satellite navigation receivers 52*a* of the satellite navigation system 52. In particular, the digital controller 25 can calculate the current heading Hc of the watercraft 10 by using known locations of the two satellite navigation receivers 52*a* on the watercraft 10 and their position data. Of course, in some cases, the digital controller 25 can obtain the current heading Hc of the watercraft 10 from the heading sensor 54.

Then, the digital controller 25 sets or updates the received current position Pc of the watercraft 10 and the received current heading Hc of the watercraft 10 as a target position Pt of the watercraft 10 and a target heading Ht of the watercraft 10 (step S12).

Furthermore, the digital controller 25 operates the propulsion units 22 and the steering units 48 to produce the predetermined lateral thrust LT in the predetermined docking direction (i.e., toward the docking structure S) (step S14).

Figure 7A:
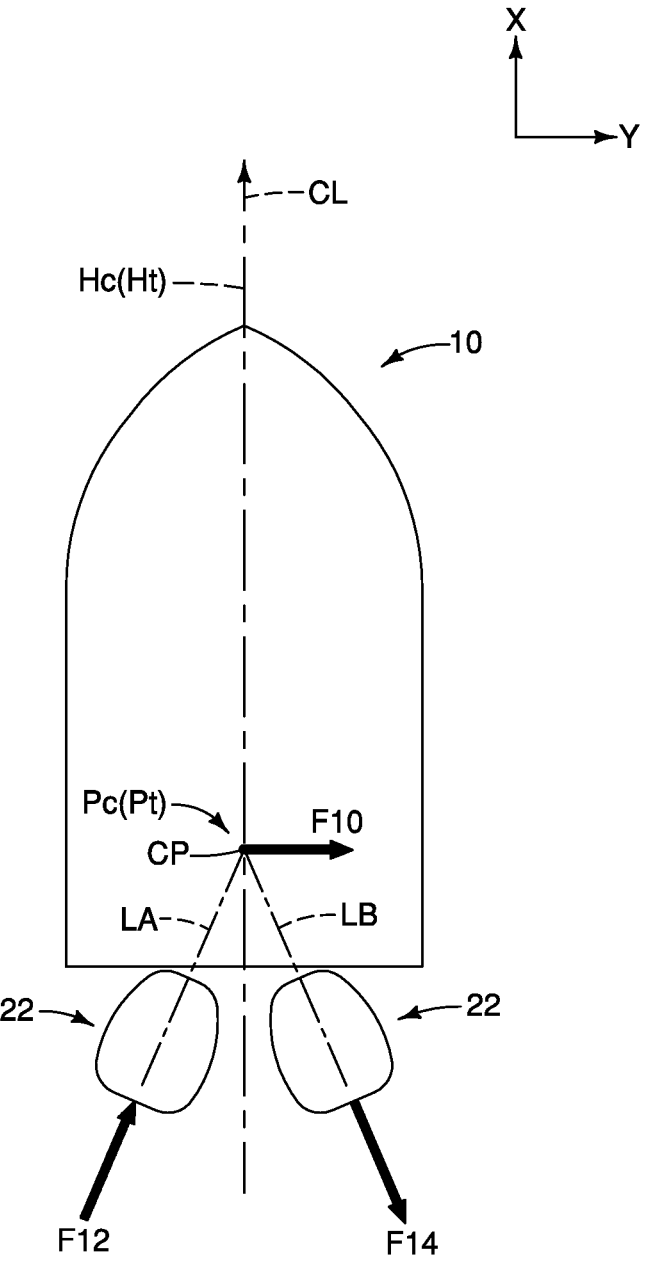
FIG. 7A is a schematic top view of the watercraft, illustrating a production of a predetermined lateral thrust in the dock holding mode.

More specifically, as seen in FIG. 7A, the digital controller 25 operates the propulsion units 22 and the steering units 48 to adjust a resultant force F10 of propulsion forces FA and FB of the propulsion units 22 such that the resultant force F10 has a predetermined magnitude of the predetermined lateral thrust LT in the predetermined docking direction (i.e., toward the docking structure S). In the illustrated embodiment, the predetermined magnitude of the predetermined lateral thrust LT and the predetermined docking direction (i.e., a predetermined direction of the predetermined lateral thrust LT) are preset and prestored in the memory 25*b* of the watercraft control system 12, for example, as default settings in advance. The user can change or update the predetermined magnitude of the predetermined lateral thrust LT and the predetermined docking direction as explained later in detail.

In particular, as seen in FIG. 7A, the digital controller 25 operates the propulsion units 22 and the steering units 48 such that the resultant force F10 is laterally applied at a center point CP of the watercraft 10. More specifically, as seen in FIG. 7A, the digital controller 25 steers both the propulsion units 22 inward (toe-in) such that the propulsion units 22 are closer to the centerline CL at the front than at the rear, and such that the lines of action LA and LB of the propulsion units 22 intersect with each other at the center point CP of the watercraft 10. Also, in the case of the docking on the starboard side, the digital controller 25 operates the propulsion units 22 and the steering units 48 to generate the forward propulsion force F12 at the left propulsion unit 22 and the reverse propulsion force F14 at the right propulsion unit 22 that has the same magnitude as the forward propulsion force F12. Thus, the resultant force F10 is applied sideways (rightward in FIG. 7A) at the center point CP of the watercraft 10. In the illustrated embodiment, the center point CP is located at the center of lateral resistance or resistance center of the watercraft 10. Thus, the resultant force F10 is merely acts on the watercraft 10 as the predetermined lateral thrust LT without changing the heading of the watercraft 10 (i.e., the moment acting on the watercraft 10 can be reduced to zero). In the case of the docking on the port side, the digital controller 25 can similarly operates the propulsion units 22 and the steering units 48 to generate the resultant force F10 acting on the watercraft 10 leftward. Of course, the digital controller 25 can operate the propulsion units 22 and the steering units 48 by different manner from an example shown in FIG. 7A to obtain the above-mentioned resultant force F10.

While the predetermined lateral thrust LT is acting on the watercraft 10, the watercraft 10 moves towards the docking structure S and makes a secure contact against the docking structure S.

While producing the predetermined lateral thrust LT (step S14), the digital controller 25 performs a heading correction operation (steps S16 and S18) and a position correction operation (steps S20 and S22).

In the heading correction operation, the difference between the current heading Hc and the target heading Ht of the watercraft 10 is corrected. Specifically, the digital controller 25 newly obtains the current heading Hc of the watercraft 10 in the above-mentioned manner, and compares the current heading Hc with the target heading Ht that has been set in step S12 (step S16). In the heading correction operation, the digital controller 25 can operate the propulsion units 22 and the steering units 48 to produce a moment about the center point CP of the watercraft 10 to compensate the difference between the current heading Hc and the target heading Ht by a feedback control. However, in the illustrated embodiment, to avoid occurrences of frequent heading controls, the digital controller 25 first determines whether the difference between the current heading Hc and the target heading Ht is equal to or greater than a predetermined angle, such as 1 degree (step S16).

If the digital controller 25 determines that the difference between the current heading Hc and the target heading Ht is not equal to or greater than the predetermined angle ("No" in step S16), then the digital controller 25 proceeds to the position correction operation (steps S20 and S22). On the other hand, if the digital controller 25 determines that the difference between the current heading Hc and the target heading Ht is equal to or greater than the predetermined angle ("Yes" in step S16), then the digital controller 25 performs the heading correction operation (step S18). Thus, in the illustrated embodiment, the digital controller 25 performs the heading correction operation upon determining a heading deviation Hd (FIG. 7B) from the target heading Ht being greater than the predetermined angle (e.g., the predetermined amount) in the heading.

Specifically, the digital controller 25 can operate the propulsion units 22 and the steering units 48 to produce a moment about the center point CP of the watercraft 10 to compensate the difference between the current heading Hc and the target heading Ht.

Figure 7B:
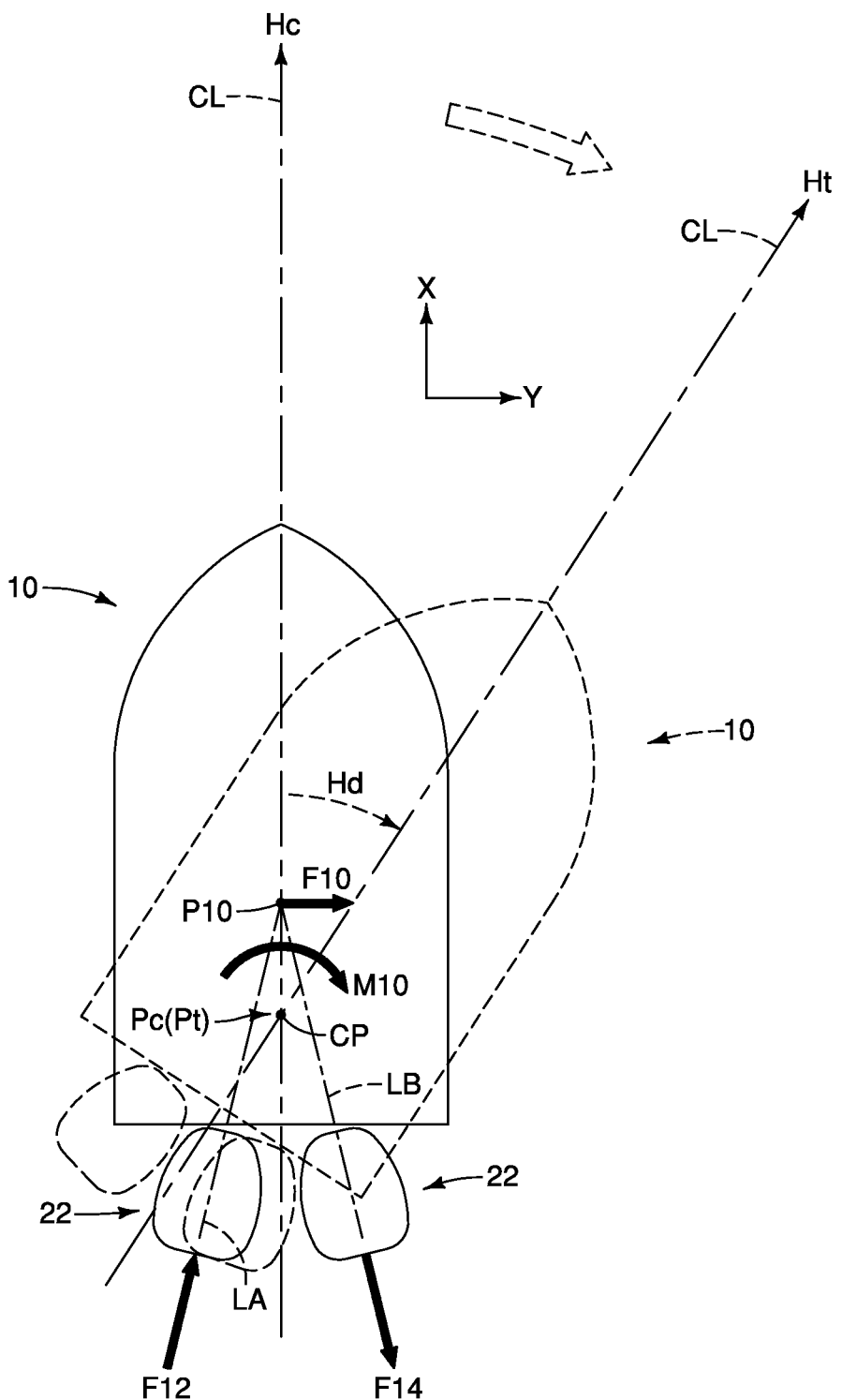
FIG. 7B is a schematic top view of the watercraft, illustrating a heading correction operation in the dock holding mode to correct a heading deviation of the watercraft.

More specifically, as seen in FIG. 7B, the digital controller 25 operates the propulsion units 22 and the steering units 48 to adjust the resultant force F10 of propulsion forces FA and FB of the propulsion units 22 such that the resultant force F10 is applied to the watercraft 10 to generate the moment M10 about the center point CP of the watercraft 10 while applying the predetermined lateral thrust LT in the predetermined docking direction (i.e., the toward the docking structure S).

FIG. 7B illustrates an example of the heading correction operation to correct the heading deviation Hd when the current heading Hc is deviated relative to the target heading Ht in the counterclockwise direction. In FIG. 7B, the watercraft 10 before the heading correction operation is illustrated with solid lines, while the watercraft 10 after the heading correction operation is illustrated with dotted lines. In this case, as shown in FIG. 7B, the digital controller 25 operates the propulsion units 22 and the steering units 48 such that the resultant force F10 having a predetermined magnitude of the predetermined lateral thrust LT in the predetermined docking direction (i.e., toward the docking structure S) is applied at an application position P10 that is disposed forward relative to the center point CP on the centerline CL. More specifically, as shown in FIG. 7B, the digital controller 25 steers both the propulsion units 16A and 16B inward (toe-in) such that the lines of action LA and LB intersect with each other at the application position P10. Also, the digital controller 25 operates the propulsion units 22 and the steering units 48 to generate the forward propulsion force F12 at the left propulsion unit 22 and the reverse propulsion force F14 at the right propulsion unit 22 that has the same magnitude as the forward propulsion force F12. Thus, the resultant force F10 is applied rightward at the application position P10, which generates the moment M10 in the clockwise direction about the center point CP of the watercraft 10. In this case, the resultant force F10 applied to the watercraft 10 merely changes the heading of the boat 10) without changing the position of the boat 10 (without translation). Also, when the current heading Hc is deviated relative to the target heading Ht in the clockwise direction, the digital controller 25 can similarly operates the propulsion units 22 and the steering units 48 to generate the resultant force F10 acting on the watercraft 10 leftward, thereby generating the moment M10 in the counterclockwise direction about the center point CP of the watercraft 10. In the illustrated embodiment, this heading correction operation can be continued until the difference between the current heading Hc and the target heading Ht becomes smaller than the predetermined angle or zero. Then, the process proceeds to the position correction operation (steps S20 and S22). Thus, in the illustrated embodiment, the digital controller 25 performs the heading correction operation by at least one of changing the propulsion forces F12 and F14 (e.g., the forward-rear thrust) and performing the steering operation of the propulsion units 22. Of course, the digital controller 25 can operate the propulsion units 22 and the steering units 48 by different manner from an example shown in FIG. 7B to obtain the above-mentioned resultant force F10 and moment M10.

Here, in the heading correction operation, the digital controller 25 can operate the propulsion units 22 and the steering units 48 to generate the moment M10 with a predetermined magnitude. However, the digital controller 25 can also operate the propulsion units 22 and the steering units 48 to change the magnitude of the moment M10 according to the magnitude of the heading deviation Hd. In particular, the digital controller 25 can operate the propulsion units 22 and the steering units 48 to increase the magnitude of the moment M10 as the magnitude of the heading deviation Hd increases. Thus, in the illustrated embodiment, the digital controller 25 can increase the moment M10 as the heading deviation Hd (e.g., the difference between the current heading Hc and the target heading Ht) increases.

In the position correction operation, the difference between the current position Pc and the target position Pt of the watercraft 10 is corrected. Specifically, the digital controller 25 newly obtains the current position Pc of the watercraft 10 in the above-mentioned manner, and compares the current position Pc with the target position Pt that has been set in step S12 (step S20). In the position correction operation, the digital controller 25 can operate the propulsion units 22 and the steering units 48 to produce a forward-rear thrust along the centerline CL to compensate the difference between the current position Pc and the target position Pt by a feedback control. However, in the illustrated embodiment, to avoid occurrences of frequent position controls, the digital controller 25 first determines whether the difference between the current position Pc and the target position Pt is equal to or greater than a predetermined distance, such as 1 foot (step S20).

If the digital controller 25 determines that the difference between the current position Pc and the target position Pt is not equal to or greater than the predetermined distance ("No" in step S20), then the digital controller 25 proceeds to step S24. On the other hand, if the digital controller 25 determines that the difference between the current position Pc and the target position Pt is equal to or greater than the predetermined distance ("Yes" in step S20), then the digital controller 25 performs the position correction operation (step S22). Thus, in the illustrated embodiment, the digital controller 25 performs the position correction operation upon determining a position deviation Pd (FIG. 7C) from the target position Pt being greater than the predetermined distance (e.g., the predetermined amount) with respect to the current position Pc.

Specifically, the digital controller 25 can operate the propulsion units 22 and the steering units 48 to produce the forward-rear thrust along the centerline CL to compensate the difference between the current position Pc and the target position Pt.

Figure 7C:
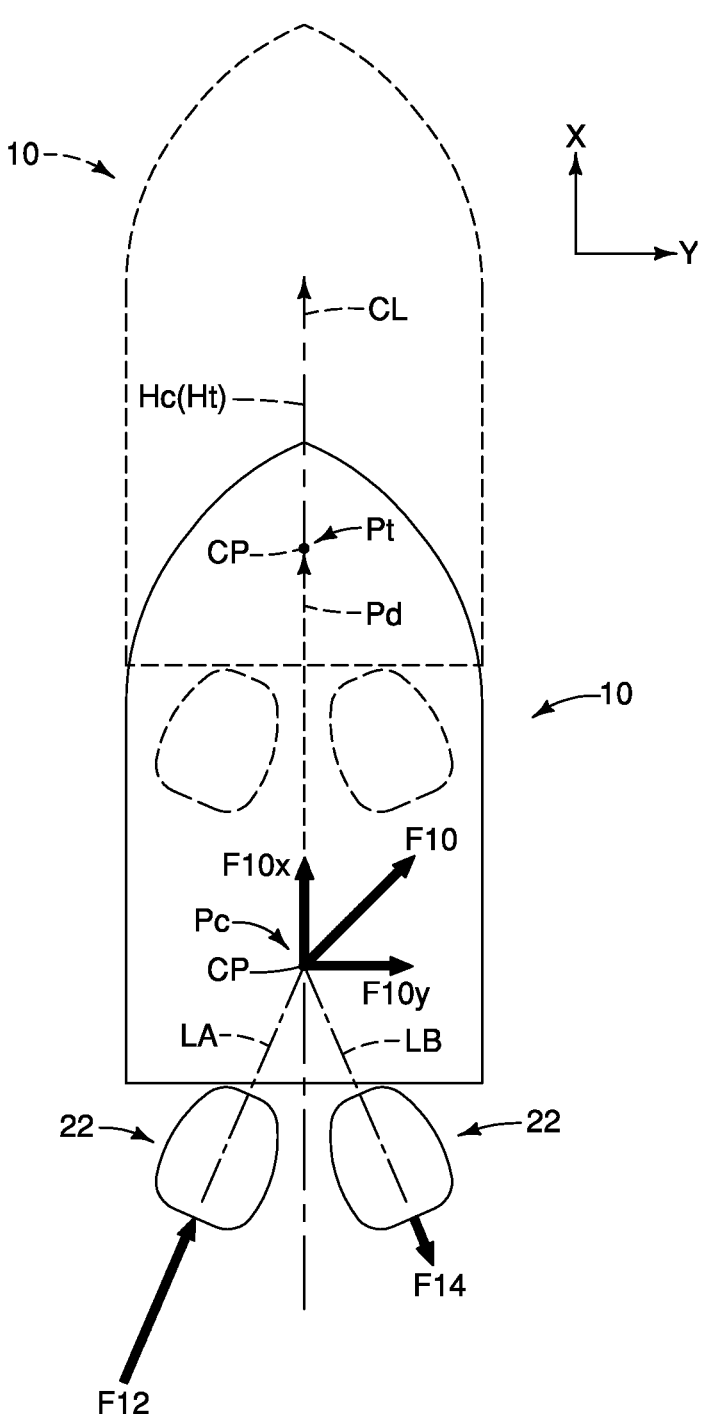
FIG. 7C is a schematic top view of the watercraft, illustrating a position correction operation in the dock holding mode to correct a position deviation of the watercraft.

In particular, as seen in FIG. 7C, the digital controller 25 operates the propulsion units 22 and the steering units 48 to adjust the resultant force F10 of propulsion forces FA and FB of the propulsion units 22 such that the resultant force F10 is applied to the watercraft 10 to apply the forward-rear thrust along the centerline CL while applying the predetermined lateral thrust LT in the predetermined docking direction (i.e., the toward the docking structure S).

FIG. 7C illustrates an example of the position correction operation to correct the position deviation Pd when the current position Pc is deviated rearward relative to the target position Pt along the centerline CL. In FIG. 7C, the watercraft 10 before the position correction operation is illustrated with solid lines, while the watercraft 10 after the position correction operation is illustrated with dotted lines. In this case, as shown in FIG. 7C, the digital controller 25 operates the propulsion units 22 and the steering units 48 such that the resultant force F10 having a longitudinal component F10$x$ (an x-axis component) in the forward direction along the centerline CL and a lateral component F10$y$ (a y-axis component) with a magnitude that is the same as the predetermined magnitude of the predetermined lateral thrust LT in the predetermined docking direction (i.e., toward the docking structure S) is applied at the center point CP of the watercraft 10. More specifically, as seen in FIG. 7C, the digital controller 25 steers both the propulsion units 22 inward (toe-in) such that the lines of action LA and LB of the propulsion units 22 intersect with each other at the center point CP of the watercraft 10. Also, the digital controller 25 operates the propulsion units 22 and the steering units 48 to generate the forward propulsion force F12 at the left propulsion unit 22 and the reverse propulsion force F14 at the right propulsion unit 22 that has a smaller magnitude as the forward propulsion force F12. Thus, the resultant force F10 is applied diagonally forward and rightward, as shown in FIG. 7C at the center point CP of the watercraft 10. In this case, the resultant force F10 applied to the watercraft 10 merely changes the position of the watercraft 10 in the longitudinal direction of the watercraft 10 along the docking structure S without changing the heading of the watercraft 10 (without rotation). Also, when the current position Pc is deviated forward relative to the target position Pt along the centerline CL, the digital controller 25 can similarly change the position of the watercraft 10 in the rearward direction along the docking structure S by generating the resultant force F10 applied diagonally rearward and rightward. Furthermore, in the case of the docking on the port side, the digital controller 25 can similarly change the position of the watercraft 10 in the forward direction (the rearward direction) along the docking structure S by generating the resultant force F10 applied diagonally forward (rearward) and leftward. In the illustrated embodiment, this position correction operation can be continued until the difference between the current position Pc and the target position Pt becomes smaller than the predetermined distance or zero. Then, the process proceeds to a target updating operation (step S24 and S26). Thus, in the illustrated embodiment, the digital controller 25 performs the position correction operation (e.g., the longitudinal correction operation) by at least one of changing the longitudinal component F10$x$ (e.g., the forward-rear thrust) and performing the steering operation of the propulsion units 22. Of course, the digital controller 25 can operate the propulsion units 22 and the steering units 48 by different manner from an example shown in FIG. 7C to obtain the above-mentioned resultant force F10.

Here, in the position correction operation, the digital controller 25 can operate the propulsion units 22 and the steering units 48 to generate the resultant force F10 having the longitudinal component F10$x$ and the lateral component F10$y$ with the predetermined magnitude of the predetermined lateral thrust LT. However, the digital controller 25 can also operate the propulsion units 22 and the steering units 48 to change the magnitude of the longitudinal component F10$x$ of the resultant force F10 according to the magnitude of the position deviation Pd. In particular, the digital controller 25 can operate the propulsion units 22 and the steering units 48 to increase the magnitude of the longitudinal component F10$x$ as the magnitude of the position deviation Pd increases. Thus, in the illustrated embodiment, the digital controller 25 can increase the longitudinal component F10$x$ (e.g., the forward-rear thrust) as the position deviation Pd (e.g., the difference between the current position Pc and the target position Pt) increases.

In the illustrated embodiment, the heading correction operation in step S18 and the position correction operations in step S22 are described as separate operations. However, the heading correction operation in step S18 and the position correction operations in step S22 can be performed as a single operation. In this case, the digital controller 25 can operate the propulsion units 22 and the steering units 48 to generate the resultant force F10 that is diagonally applied to the application position P10 spaced apart from the center point CP. With this configuration, the digital controller 25 can simultaneously generate the longitudinal component F10$x$ needed for correcting the position deviation Pd and the moment M10 needed for correcting the heading deviation Hd while generating the lateral component F10$y$ as the predetermined lateral thrust LT.

In the target updating operation, the target position Pc and the target heading Hc that has been set in step S12 and the predetermined lateral thrust LT preset in the memory 25$b$ can be manually updated or changed based on a user input operation using the joystick 19 as a user input (steps S24 and S26). In particular, the digital controller 25 first determines whether the joystick 19 is operated (step S24). Specifically, when the digital controller 25 does not receive an operation signal indicative of the user input operation from the joystick 19 for a predetermined period, then the digital controller 25 determines that the joystick 19 is not operated ("No" in step S24). Then, the process proceeds to step S28.

On the other hand, when the digital controller 25 receives the operation signal indicative of the user input operation from the joystick 19, then the digital controller 25 determines that the joystick 19 is operated ("Yes" in step S24). Then, the process proceeds to step S26 to update the target position Pc, the target heading Hc and the predetermined lateral thrust LT (i.e., the predetermined magnitude of the predetermined lateral thrust LT and the predetermined docking direction) according to the user input operation relative to the joystick 19. Thus, in the illustrated embodiment, the digital controller 25 updates at least one of the target heading Ht, the target position Pt, and the predetermined lateral thrust LT based on the user input operation using the joystick 19 during the dock holding mode. In particular, in the illustrated embodiment, the joystick 19 is utilized as a user input for updating the at least one of the target heading Ht, the target position Pt, and the predetermined lateral thrust LT. However, in some cases, other devices, such as the control panel 60, the display monitor 56, the multifunction display, can be utilized as the user input for updating the at least one of the target heading Ht, the target position Pt, and the predetermined lateral thrust LT, as needed and/or desired.

In the illustrated embodiment, as seen in FIG. 5, the user can move the joystick 19 along a longitudinal direction (i.e., a forward direction F and a rearward direction R) and along a lateral direction (i.e., a starboard side direction S and a port side direction P), as the user input operation. Also, the user can twist the joystick 19 in a clockwise direction C1 and in a counterclockwise direction C2, as the user input operation. In the illustrated embodiment, the longitudinal direction (i.e., the forward direction F and the rearward direction R) substantially extends parallel to the centerline CL or the X-axis of the watercraft 10, and the lateral direction (i.e., the starboard side direction S and the port side direction P) is substantially perpendicular to the centerline CL and extends along the Y-axis.

In step S26, the digital controller 25 updates the target heading Ht in response to the joystick 19 being twisted during the dock holding mode. Specifically, the digital controller 25 moves the target heading Ht in the clockwise direction in response to the joystick 19 being twisted in the clockwise direction C1, while the digital controller 25 moves the target heading Ht in the counterclockwise direction in response to the joystick 19 being twisted in the counterclockwise direction C2. In this case, the degree of movement of the target heading Ht can also be adjusted according to the degree of movement of the joystick 19 in the clockwise direction C1 or in the counterclockwise direction C2.

In step S26, the digital controller 25 further updates the target position Pt in response to the joystick 19 being moved in the longitudinal direction during the dock holding mode. Specifically, the digital controller 25 moves the target position Pt forward along the centerline CL in response to the joystick 19 being moved in the forward direction F, while the digital controller 25 moves the target position Pt rearward along the centerline CL in response to the joystick 19 being moved in the rearward direction R. In this case, the degree of movement of the target position Pt can also be adjusted according to the degree of movement of the joystick 19 in the longitudinal direction.

In step S26, the digital controller 25 further updates the predetermined lateral thrust LT in response to the joystick 19 being moved in the lateral direction during the dock holding mode. Specifically, the digital controller 25 increases the predetermined magnitude of the predetermined lateral thrust LT in the predetermined docking direction in response to the joystick 19 being moved in a direction (i.e., the starboard side direction S or the port side direction P) that is the same as the predetermined docking direction, while the digital controller 25 decreases the predetermined magnitude of the predetermined lateral thrust LT in the predetermined docking direction in response to the joystick 19 being moved in a direction (i.e., the starboard side direction S or the port side direction P) that is opposite to the predetermined docking direction. More specifically, in the case of the docking on the starboard side, as seen in FIG. 1, the digital controller 25 increases the predetermined magnitude of the predetermined lateral thrust LT toward the docking structure S in response to the joystick 19 being moved in the starboard side direction S, while the digital controller 25 decreases the predetermined magnitude of the predetermined lateral thrust LT toward the docking structure S in response to the joystick 19 being moved in the port side direction P. In this case, the degree of change of the predetermined magnitude of the predetermined lateral thrust LT can also be adjusted according to the degree of movement of the joystick 19 in the lateral direction.

Alternatively or additionally, in step S26, the digital controller 25 can update at least one of the magnitude of the moment M10 (FIG. 7B) for the heading correction in step S18, and the magnitude of the longitudinal component F10x (FIG. 7C) and the magnitude of the lateral component F10y (FIG. 7C) for the position correction in step S22 according to the user input operation relative to the joystick 19 during the dock holding mode. This mode can be started in response to a user selection of a control button of the joystick 19 in step S26, for example.

In this case, in step S26, the digital controller 25 can increase or decrease the moment M10 generated towards the target heading Ht during the heading correction (step S18) in response to the joystick 19 being twisted during the dock holding mode. Specifically, the digital controller 25 operates the propulsion units 22 and the steering units 48 to increase the moment M10 generated towards the target heading Ht in response to the joystick 19 being twisted in the clockwise direction C1 (e.g., the first direction) during the dock holding mode. Also, the digital controller 25 operates the propulsion units 22 and the steering units 48 to decrease the moment M10 generated towards the target heading Ht in response to the joystick 19 being twisted in the counterclockwise direction C2 (e.g., the second direction) that is opposite to the clockwise direction C1 during the dock holding mode.

Furthermore, in step S26, the digital controller 25 can increase or decrease the magnitude of the longitudinal component F10x of the resultant force F10 in response to the joystick 19 being moved in the longitudinal direction during the dock holding mode. Specifically, the digital controller 25 operates the propulsion units 22 and the steering units 48 to generate a forward thrust toward the target position Pt in response to the joystick 19 being moved in the forward direction F during the dock holding mode. In particular, the digital controller 25 operates the propulsion units 22 and the steering units 48 to increase the longitudinal component F10x toward the target position Pt in response to the joystick 19 being moved in the forward direction F when the longitudinal component F10x is forwardly directed, while the digital controller 25 operates the propulsion units 22 and the steering units 48 to decrease the longitudinal component F10x toward the target position Pt in response to the joystick 19 being moved in the forward direction F when the longitudinal component F10x is rearwardly directed. Also, the digital controller 25 operates the propulsion units 22 and the steering units 48 to generate a rearward thrust toward the target position Pt in response to the joystick 19 being moved in the rearward direction R during the dock holding mode. In particular, the digital controller 25 operates the propulsion units 22 and the steering units 48 to increase the longitudinal component F10x toward the target position Pt in response to the joystick 19 being moved in the rearward direction R when the longitudinal component F10x is rearwardly directed, while the digital controller 25 operates the propulsion units 22 and the steering units 48 to decrease the longitudinal component F10x toward the target position Pt in response to the joystick 19 being moved in the rearward direction R when the longitudinal component F10x is forwardly directed.

Furthermore, in step S26, the digital controller 25 can increase or decrease the magnitude of the lateral component F10y of the resultant force F10 in response to the joystick 19 being moved in the lateral direction during the dock holding mode. Specifically, the digital controller 25 operates the propulsion units 22 and the steering units 48 to generate a starboard lateral thrust toward the target position Pt in response to the joystick 19 being moved in the starboard side direction S during the dock holding mode. In particular, the digital controller 25 operates the propulsion units 22 and the steering units 48 to increase the lateral component F10y in response to the joystick 19 being moved in the starboard side direction S when the lateral component F10y is directed rightward (toward the starboard side), while the digital controller 25 operates the propulsion units 22 and the steering units 48 to decrease the lateral component F10y in response to the joystick 19 being moved in the starboard side direction S when the lateral component F10y is directed leftward (toward the port side). Also, the digital controller 25 operates the propulsion units 22 and the steering units 48 to generate a port lateral thrust toward the target position Pt in response to the joystick 19 being moved in the port side direction P during the dock holding mode. In particular, the digital controller 25 operates the propulsion units 22 and the steering units 48 to increase the lateral component F10y in response to the joystick 19 being moved in the port side direction P when the longitudinal component F10x is directed leftward (toward the port side), while the digital controller 25 operates the propulsion units 22 and the steering units 48 to decrease the lateral component F10y in response to the joystick 19 being moved in the port side direction P when the lateral component F10y is directed rightward (toward the starboard side).

In step S28, the digital controller 25 detects whether the control button 19a or the controller button 60a is pressed again to deactivate the dock holding mode. If the digital controller 25 does not detect that the control button 19a or the controller button 60a is pressed again ("No" in step S28), then the process returns to step S16. On the other hand, if the digital controller 25 detects that the control button 19a or the controller button 60a is pressed again ("Yes" in step S28), then the digital controller 25 deactivates the dock holding mode, and the watercraft control system 12 enters the standby or idling mode (S30).

In the illustrated embodiment, the watercraft control system 12 comprises the propulsion units 22, the joystick 19 (e.g., the user input), at least one satellite navigation receiver 52a (e.g., the positioning system), and the digital controller 25. The joystick 19 outputs the dock holding command. The at least one satellite navigation receiver 52a determines at least one of the current position Pc (e.g., the forward-rear position) and the current heading Hc of the watercraft 10. The digital controller 25 receives the dock holding command. The digital controller 25 starts the dock holding mode upon receiving the dock holding command. The digital controller 25 controls the propulsion units 22 to produce the predetermined lateral thrust LT to hold the watercraft 10 against the docking structure S during the dock holding mode. The digital controller 25 sets at least one of the target position Pt and the target heading Ht based on at least one of the current position Pc detected by the at least one satellite navigation receiver 52a and the current heading Hc detected by the at least one satellite navigation receiver 52a during the dock holding mode. The digital controller 25 performs the position correction operation or the heading correction operation to restore at least one of the target position Pt and the target heading Ht by generating at least one of the longitudinal component F10x of the resultant force F10 (e.g., the forward-rear thrust) using the propulsion units 22 upon determining the position deviation Pd of the current position Pc from the target position Pt and the moment M10 using the propulsion units 22 upon determining the current heading Hc has deviated from the target heading Ht while generating the predetermined lateral thrust LT during the dock holding mode.

In the illustrated embodiment, the watercraft control method comprises starting the dock holding mode using the digital controller 25 upon receiving the docking holding command (step S10), controlling the propulsion units 22 using the digital controller 25 to produce the predetermined lateral thrust LT to hold the watercraft 10 against the docking structure S (step S14), setting at least one of the target position Pt and the target heading Ht using the digital controller 25 based on at least one of the current position Pc detected using at least one satellite navigation receiver 52a (e.g., the positioning system) and the current heading Hc detected by the at least one satellite navigation receiver 52a during the dock holding mode (step S12), and performing the position correction operation (step S22) or the heading correction operation (step S18) using the digital controller 25 to restore at least one of the target position Pt and the target heading Ht by generating at least one of the longitudinal component F10x of the resultant force F10 (e.g., the forward-rear thrust) using the propulsion units 22 upon determining the position deviation Pd of the current position Pc from the target position Pt and the moment M10 using the propulsion units 22 upon determining the current heading Hc has deviated from the target heading Ht while generating the predetermined lateral thrust LT during the dock holding mode.

Figure 8:
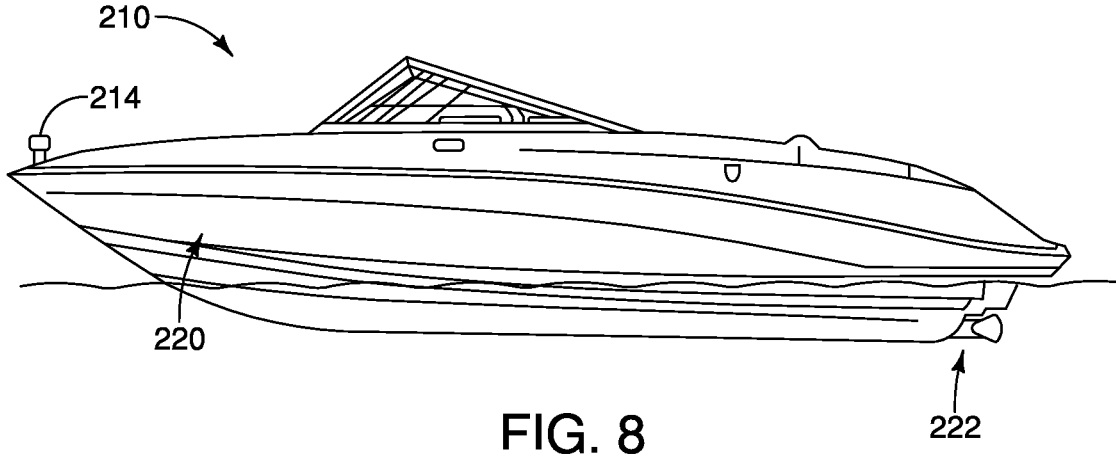
FIG. 8 is a side elevational view of a watercraft equipped with the watercraft control system in which the watercraft is a jet boat that uses jet propulsion.
Figure 9:
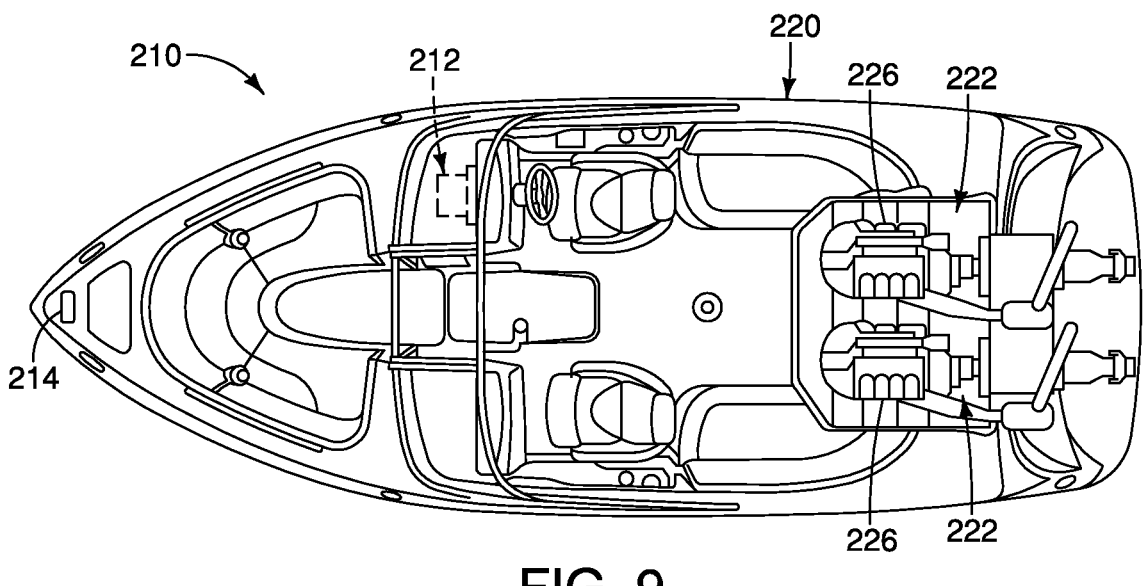
FIG. 9 is a top view of the watercraft illustrated in FIG. 7 with a portion of the watercraft broken away to reveal a pair of jet propulsion units.
Figure 10:
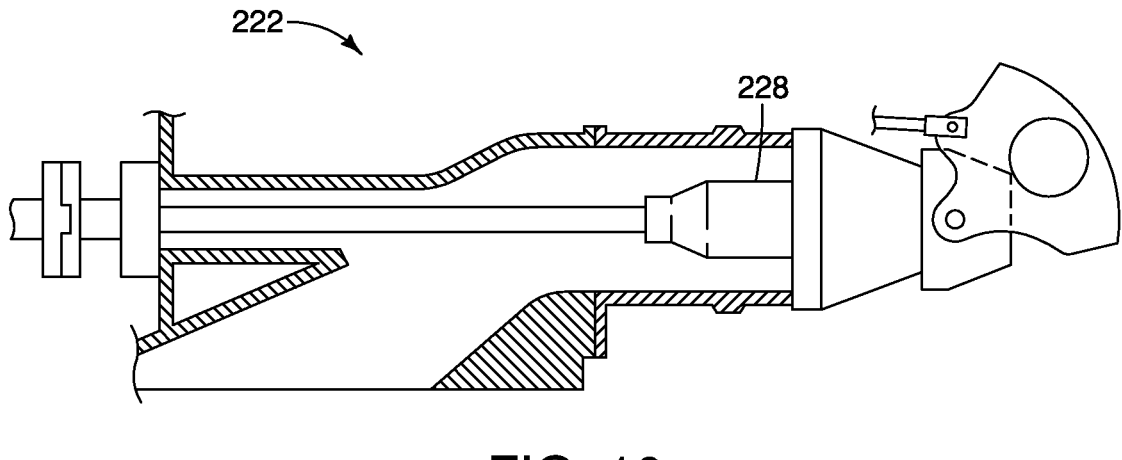
FIG. 10 is a simplified cross-sectional view of one of the jet propulsion units of the watercraft illustrated in FIGS. 8 and 9.

Referring now to FIGS. 8 to 10, a watercraft 210 is illustrated in the form of a jet propulsion boat that is equipped with a watercraft control system 212. The watercraft control system 212 is the same as the watercraft control system 12, discussed above, except that the watercraft control system 212 is adapted to a jet propulsion boat. Basically, the watercraft 210 includes a watercraft body 220 and a pair of propulsion units 222. The watercraft body 220 is provided with the propulsion units 222 in a conventional manner. The propulsion units 222 are steerable in a conventional manner. Each of the propulsion units 222 includes an engine 226 as seen in FIG. 9. Each of the engines 226 drives an impeller 228 as seen in FIG. 10 in a conventional manner. Since jet propulsion boats are well known, the watercraft 210 will not be discussed in more detail.

The watercraft control system 212 is configured to execute the dock holding mode in the same way as the watercraft control system 12. Thus, the watercraft 210 is provided with a positioning system 214 for dock holding control of the watercraft 210. The positioning system 214 is the same as the positioning system of the watercraft 10 and can include a running speed detector, at least one satellite navigation receiver and a heading sensor. Of course, the watercraft 210 can further include one or more active sensors, the image recognition device and/or the optical sensors that are used to detect the peripheral environment of the watercraft 210 in real-time. In this way, the watercraft control system 212 can execute the dock holding mode in the same way as the watercraft control system 12.

Figure 11:
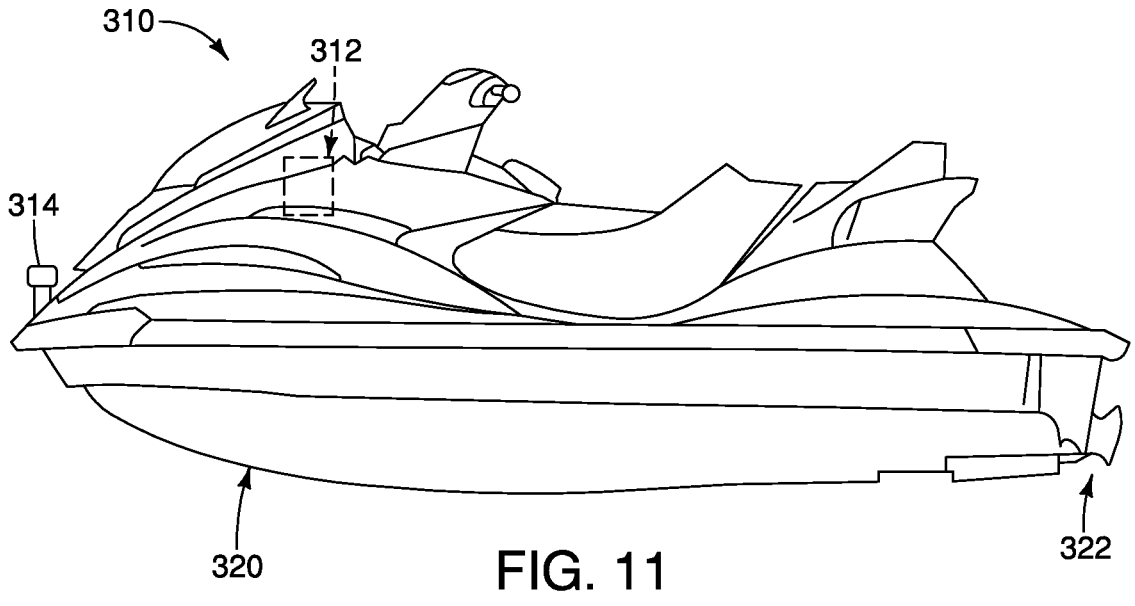
FIG. 11 is a side elevational view of a watercraft equipped with the watercraft control system in which the watercraft is a personal watercraft that uses jet propulsion.

Referring now to FIG. 11, a watercraft 310 is illustrated in the form of a personal watercraft that is equipped with a watercraft control system 312. The watercraft 310 is a saddle seat type of personal watercraft that is well known. The watercraft control system 312 is the same as the watercraft control system 12, discussed above, except that the watercraft control system 312 is adapted to a personal watercraft. Basically, the watercraft 310 includes a watercraft body 320 and a single propulsion unit 322. The watercraft body 320 is provided with the propulsion unit 322 in a conventional manner. The propulsion unit 322 is a jet propulsion device similar to the one illustrated in FIG. 10. The watercraft control system 312 of the watercraft 310 is configured to carry out the dock holding mode in the same manner as discussed above. Since personal watercrafts are well known, the watercraft 310 will not be discussed in more detail.

The watercraft control system 312 is configured to execute the dock holding mode in the same way as the watercraft control system 12. Thus, the watercraft 310 is provided with a positioning system 314 for dock holding control of the watercraft 310. The positioning system 314 is the same as the positioning system of the watercraft 10 and can include a running speed detector, at least one satellite navigation receiver and a heading sensor. Of course, the watercraft 310 can further include one or more active sensors, the image recognition device and/or the optical sensors that are used to detect the peripheral environment of the watercraft 310 in real-time. In this way, the watercraft control system 312 can execute the dock holding mode in substantially the same way as the watercraft control system 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, layers, positions and/or sections, these elements, components, regions, layers, positions and/or sections should not be limited by these terms. These terms are only used to distinguish one element, component, region, layer, position or section from another element, component, region, layer, position or section. Thus, a first element, component, region, layer, position or section discussed above could be termed a second element, component, region, layer, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a watercraft floating in calm water.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of". The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A watercraft control system comprising:
a plurality of outboard propulsion units;

a user interface configured to output a dock holding command to initiate a dock holding mode;

a position sensor configured to determine at least one of a current position and a current heading of a watercraft; and a digital processor configured to receive the dock holding command to initiate the dock holding mode in response to the user interface outputting the dock holding command to initiate the dock holding mode, control the outboard propulsion units to produce a predetermined lateral thrust to hold the watercraft against a docking structure during the dock holding mode, set a target position to the current position detected by the position sensor when the dock holding command is received from a user, or set a target heading to the current heading detected by the position sensor when the dock holding command is received from the user, and perform a correction operation to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode, the digital processor being further configured to update at least one of the target heading, the target position and the predetermined lateral thrust, while generating the predetermined lateral thrust during the dock holding mode.

2. The watercraft control system according to claim 1, wherein the digital processor is further configured to perform the correction operation upon determining the deviation from the target position being greater than a predetermined amount with respect to the current position.

3. The watercraft control system according to claim 1, wherein the digital processor is further configured to increase the forward-rear thrust as a difference between the current position and the target position increases.

4. The watercraft control system according to claim 1, wherein the digital processor is further configured to perform a longitudinal correction operation by at least one of changing the forward-rear thrust and performing a steering operation of the outboard propulsion units.

5. The watercraft control system according to claim 1, wherein the digital processor is further configured to perform the correction operation upon determining a deviation from the target heading being greater than a predetermined amount in the heading.

6. The watercraft control system according to claim 5, wherein the digital processor is further configured to increase the moment as a difference between the current heading and the target heading increases.

7. The watercraft control system according to claim 1, wherein the digital processor is further configured to perform a heading correction operation by at least one of changing the forward-rear thrust and performing a steering operation of the outboard propulsion units.

8. The watercraft control system according to claim 1, wherein the digital processor is further configured to terminate the dock holding mode upon receiving a termination command from the user interface.

9. A watercraft comprising the watercraft control system according to claim 1, and further comprising:

a watercraft body provided with the outboard propulsion units, the user interface, the position sensor and the digital processor.

10. A watercraft control system comprising:

a plurality of outboard propulsion units;

a user interface configured to output a dock holding command, the user interface including a joystick;

a position sensor configured to determine at least one of a current position and a current heading of a watercraft; and a digital processor configured to receive the dock holding command, the digital processor configured to start a dock holding mode upon receiving the dock holding command, control the outboard propulsion units to produce a predetermined lateral thrust to hold the watercraft against a docking structure during the dock holding mode, set at least one of a target position and a target heading based on at least one of the current position detected by the position sensor and the current heading detected by the position sensor during the dock holding mode, and perform a correction operation to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode, the digital processor being further configured to update, based on a user input operation using the joystick, at least one of the target heading, the target position and the predetermined lateral thrust, while generating the predetermined lateral thrust during the dock holding mode.

11. The watercraft control system according to claim 10, wherein the digital processor is further configured to update the target heading in response to the joystick being twisted during the dock holding mode.

12. The watercraft control system according to claim 10, wherein the digital processor is further configured to increase or decrease a moment generated towards the target heading in response to the joystick being twisted during the dock holding mode.

13. The watercraft control system according to claim 10, wherein the digital processor is further configured to update the target position in response to the joystick being moved in a longitudinal direction during the dock holding mode.

14. The watercraft control system according to claim 10, wherein the digital processor is further configured to increase or decrease the forward-rear thrust in response to the joystick being moved in a longitudinal direction during the dock holding mode.

15. The watercraft control system according to claim 10, wherein the digital processor is further configured to update the predetermined lateral thrust in response to the joystick being moved in a lateral direction during the dock holding mode.

16. The watercraft control system according to claim 12, wherein the digital processor is further configured to increase the moment generated towards the target heading in response to the joystick being twisted in a first direction during the dock holding mode, and decrease the moment generated towards the target heading in response to the joystick being twisted in a second direction that is opposite to the first direction during the dock holding mode.

17. The watercraft control system according to claim 10, wherein the digital processor is further configured to generate a forward thrust toward the target position in response to the joystick being moved in a forward direction during the dock holding mode, and generate a rearward thrust toward the target position in response to the joystick being moved in a rearward direction during the dock holding mode.

18. The watercraft control system according to claim 10, wherein the digital processor is further configured to generate a starboard lateral thrust toward the target position in response to the joystick being moved in a starboard side direction during the dock holding mode, and generate a port lateral thrust toward the target position in response to the joystick being moved in a port side direction during the dock holding mode.

19. A watercraft control method comprising:

receiving a dock holding command to initiate a dock holding mode using a digital processor in response to a user interface outputting the docking holding command;

controlling a plurality of outboard propulsion units using the digital processor to produce a predetermined lateral thrust to hold a watercraft against a docking structure during the dock holding mode;

setting, using the digital processor, a target position to a current position detected by a position sensor when the dock holding command is received from a user, or set a target heading to a current heading detected by the position sensor when the dock holding command is received from the user;

performing correction operation using the digital processor to restore at least one of the target position and the target heading by generating at least one of a forward-rear thrust using the outboard propulsion units upon determining a deviation of the current position from the target position and a moment using the outboard propulsion units upon determining the current heading has deviated from the target heading while generating the predetermined lateral thrust during the dock holding mode; and updating, using the digital processor, at least one of the target heading, the target position and the predetermined lateral thrust, while generating the predetermined lateral thrust during the dock holding mode.

* * * * *